United States Patent
Akumiah et al.

(10) Patent No.: US 10,506,289 B2
(45) Date of Patent: Dec. 10, 2019

(54) SCHEDULING LIVE VIDEOS

(71) Applicant: Facebook, Inc., Menlo Park, CA (US)

(72) Inventors: Howard Akumiah, San Francisco, CA (US); Brady John Brayley Voss, Austin, TX (US); Brian Robert Lin, New York, NY (US); Valerie Chao, Palo Alto, CA (US); William B. Harding, Katonah, NY (US)

(73) Assignee: Facebook, Inc., Menlo Park, CA (US)

( * ) Notice: Subject to any disclaimer, the term of this patent is extended or adjusted under 35 U.S.C. 154(b) by 17 days.

(21) Appl. No.: 15/395,054

(22) Filed: Dec. 30, 2016

(65) Prior Publication Data
US 2018/0192143 A1   Jul. 5, 2018

(51) Int. Cl.
| | | |
|---|---|---|
| *H04N 21/2187* | (2011.01) | |
| *H04N 21/472* | (2011.01) | |
| *H04L 29/08* | (2006.01) | |
| *H04N 21/4788* | (2011.01) | |
| *H04N 21/262* | (2011.01) | |
| *H04L 12/58* | (2006.01) | |
| *H04L 12/18* | (2006.01) | |

(52) U.S. Cl.
CPC ... *H04N 21/47214* (2013.01); *H04L 12/1818* (2013.01); *H04L 51/046* (2013.01); *H04L 51/10* (2013.01); *H04L 51/32* (2013.01); *H04L 67/26* (2013.01); *H04L 67/325* (2013.01); *H04N 21/2187* (2013.01); *H04N 21/26241* (2013.01); *H04N 21/4788* (2013.01); *H04L 67/306* (2013.01)

(58) Field of Classification Search
CPC ......... H04N 21/47214; H04N 21/4788; H04N 21/2187; H04N 21/26241; H04L 51/046; H04L 12/1818; H04L 51/32; H04L 51/10; H04L 67/325; H04L 67/26; H04L 67/306
See application file for complete search history.

(56) References Cited

U.S. PATENT DOCUMENTS

| | | | | |
|---|---|---|---|---|
| 6,636,888 | B1 * | 10/2003 | Bookspan | G06Q 10/109 709/200 |
| 8,112,490 | B2 * | 2/2012 | Upton | H04L 12/1827 709/208 |
| 8,554,840 | B1 * | 10/2013 | Milgramm | H04N 21/2187 348/E5.006 |
| 2007/0283403 | A1 * | 12/2007 | Eklund, II | G09B 5/06 725/117 |

(Continued)

*Primary Examiner* — Junior O Mendoza
(74) *Attorney, Agent, or Firm* — Baker Botts L.L.P.

(57) ABSTRACT

A method includes receiving an indication from a client computing device that a first user has selected one or more options from a composer interface to schedule a live video for broadcast by the first user at a future start time. The method also includes determining one or more second users who are connected to the first user in a social graph and sending a first notification to each of the second users. Each notification includes a first selectable option to receive a future notification about the live video. The method also includes sending a second notification to each of the second users who selected the first selectable option, the second notification including a second selectable option to view the live video. The method also includes providing the live video for display to the second users who select the second selectable option.

17 Claims, 12 Drawing Sheets

(56) References Cited

U.S. PATENT DOCUMENTS

| | | | | |
|---|---|---|---|---|
| 2009/0144786 A1* | 6/2009 | Branam | ............ | H04N 5/44543 |
| | | | | 725/109 |
| 2010/0058410 A1* | 3/2010 | Rance | .................... | H04N 7/173 |
| | | | | 725/109 |
| 2010/0128103 A1* | 5/2010 | Sim | ........................ | H04N 7/147 |
| | | | | 348/14.02 |
| 2012/0072961 A1* | 3/2012 | Marignan | .......... | H04N 7/17318 |
| | | | | 725/109 |
| 2014/0013367 A1* | 1/2014 | Elhag | ................ | H04N 21/2665 |
| | | | | 725/95 |
| 2015/0120768 A1* | 4/2015 | Wellen | .................... | G06F 17/20 |
| | | | | 707/755 |
| 2015/0358584 A1* | 12/2015 | Mattson | .................... | H04N 7/15 |
| | | | | 348/14.08 |
| 2016/0057457 A1* | 2/2016 | Clements | ........... | H04N 21/2187 |
| | | | | 725/109 |
| 2016/0330258 A1* | 11/2016 | Sandhu | .................... | H04L 67/16 |
| 2016/0373499 A1* | 12/2016 | Wagner | .............. | H04N 21/2187 |
| 2017/0279751 A1* | 9/2017 | Quirarte | ................. | H04L 51/10 |

\* cited by examiner

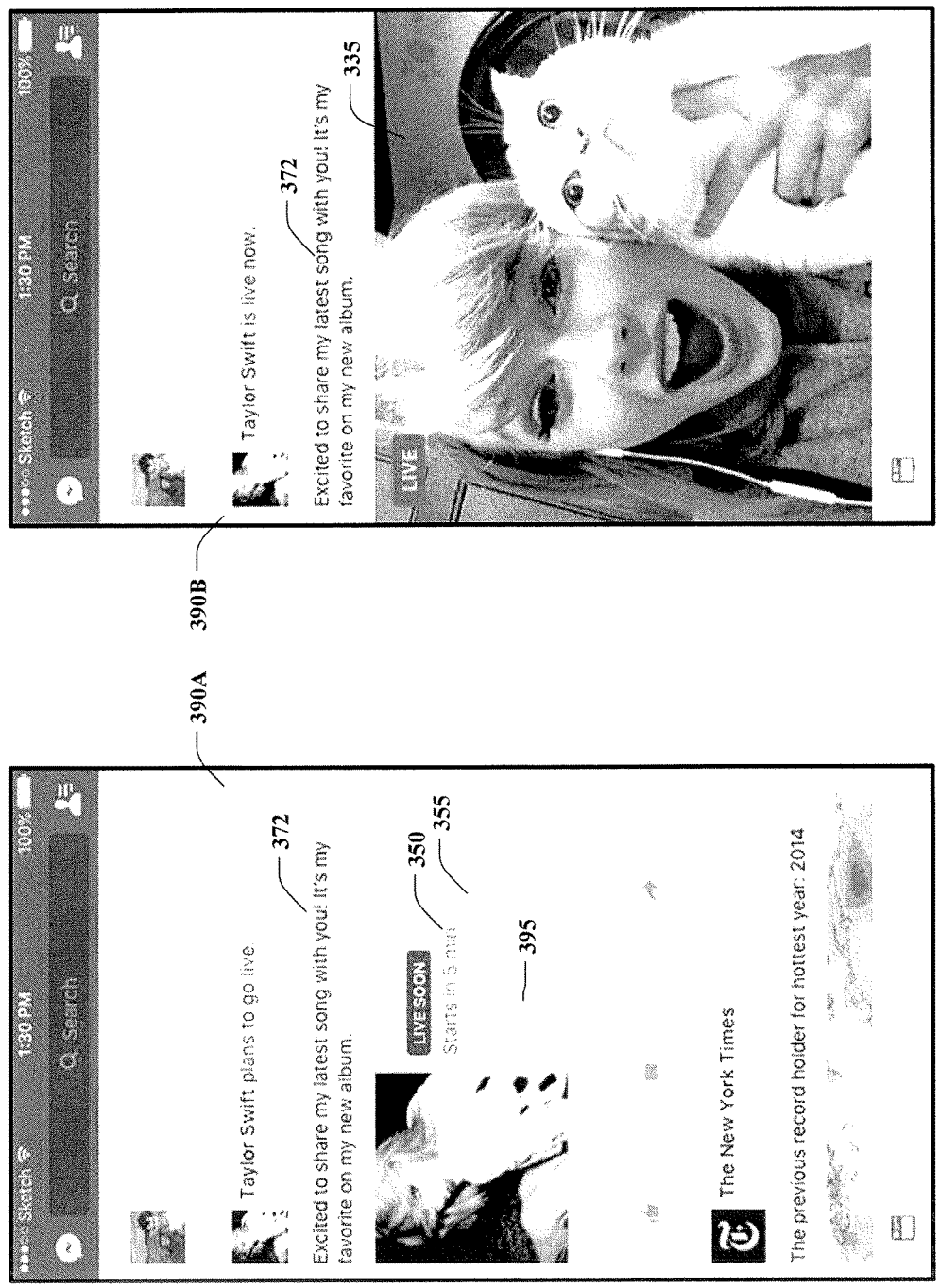

SCHEDULING LIVE VIDEOS

TECHNICAL FIELD

This disclosure generally relates to videos and more particularly to scheduling live videos.

BACKGROUND

A social-networking system, which may include a social-networking website, may enable its users (such as persons or organizations) to interact with it and with each other through it. The social-networking system may, with input from a user, create and store in the social-networking system a user profile associated with the user. The user profile may include demographic information, communication-channel information, and information on personal interests of the user. The social-networking system may also, with input from a user, create and store a record of relationships of the user with other users of the social-networking system, as well as provide services (e.g., wall posts, photo-sharing, event organization, messaging, games, or advertisements) to facilitate social interaction between or among users.

The social-networking system may send over one or more networks content or messages related to its services to a mobile or other computing device of a user. A user may also install software applications on a mobile or other computing device of the user for accessing a user profile of the user and other data within the social-networking system. The social-networking system may generate a personalized set of content objects to display to a user, such as a newsfeed of aggregated stories of other users connected to the user.

A mobile computing device—such as a smartphone, tablet computer, or laptop computer—may include functionality for determining its location, direction, or orientation, such as a GPS receiver, compass, gyroscope, or accelerometer. Such a device may also include functionality for wireless communication, such as BLUETOOTH communication, near-field communication (NFC), or infrared (IR) communication or communication with a wireless local area networks (WLANs) or cellular-telephone network. Such a device may also include one or more cameras, scanners, touchscreens, microphones, or speakers. Mobile computing devices may also execute software applications, such as games, web browsers, or social-networking applications. With social-networking applications, users may connect, communicate, and share information with other users in their social networks.

SUMMARY OF PARTICULAR EMBODIMENTS

Particular embodiments provide users of a social network the ability to schedule live videos to be broadcast at a future start time to other uses of the social network. For example, a user may be provided with a composer interface that allows the user to broadcast a live video. The user may also be provided with options to schedule the live video to be broadcast a future start time. For example, the user may select to broadcast the live video a certain amount of time in the future or at a specific future date and time. Friends or other connections of the user on the social network may then receive a notification (e.g., a post in their timeline) that notifies them about the future live video. In certain embodiments, the notification of the future live video may include an option to receive a future notification about the live video. For example, the notification may include a "Follow" button that allows the user to receive another notification when the live video is available to view or is about to be available to view. If the user selects to "Follow" the live video, they may then receive a second notification when the live video is available to view or is within a certain amount of time of its scheduled start time. The second notification may include another selectable option (e.g., a "Join" button) that, once selected, plays the live video or displays an interface in which the live video may be viewed.

The embodiments disclosed above are only examples, and the scope of this disclosure is not limited to them. Particular embodiments may include all, some, or none of the components, elements, features, functions, operations, or steps of the embodiments disclosed above. Embodiments according to the invention are in particular disclosed in the attached claims directed to a method, a storage medium, a system and a computer program product, wherein any feature mentioned in one claim category, e.g. method, can be claimed in another claim category, e.g. system, as well. The dependencies or references back in the attached claims are chosen for formal reasons only. However any subject matter resulting from a deliberate reference back to any previous claims (in particular multiple dependencies) can be claimed as well, so that any combination of claims and the features thereof are disclosed and can be claimed regardless of the dependencies chosen in the attached claims. The subject-matter which can be claimed comprises not only the combinations of features as set out in the attached claims but also any other combination of features in the claims, wherein each feature mentioned in the claims can be combined with any other feature or combination of other features in the claims. Furthermore, any of the embodiments and features described or depicted herein can be claimed in a separate claim and/or in any combination with any embodiment or feature described or depicted herein or with any of the features of the attached claims.

BRIEF DESCRIPTION OF THE DRAWINGS

FIGS. 3A-3K illustrate various interfaces related to scheduling live videos.

DESCRIPTION OF EXAMPLE EMBODIMENTS

Figure 1:
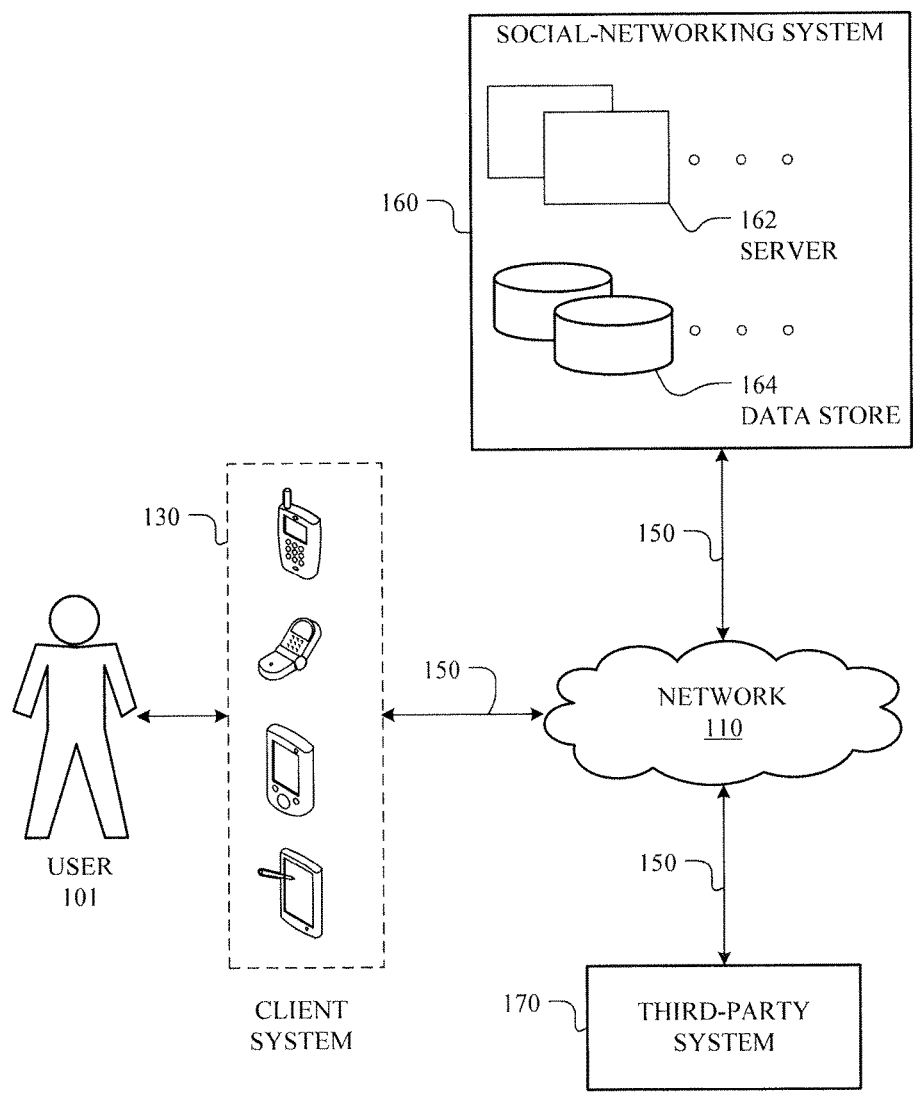
FIG. 1 illustrates an example network environment associated with a social-networking system.

FIG. 1 illustrates an example network environment 100 associated with a social-networking system. Network environment 100 includes a user 101, a client system 130, a social-networking system 160, and a third-party system 170 connected to each other by a network 110. Although FIG. 1 illustrates a particular arrangement of user 101, client system 130, social-networking system 160, third-party system 170, and network 110, this disclosure contemplates any suitable arrangement of user 101, client system 130, social-networking system 160, third-party system 170, and network 110. As an example and not by way of limitation, two or more of client system 130, social-networking system 160, and third-party system 170 may be connected to each other directly, bypassing network 110. As another example, two or more of client system 130, social-networking system 160, and third-party system 170 may be physically or logically co-located with each other in whole or in part. Moreover, although FIG. 1 illustrates a particular number of users 101, client systems 130, social-networking systems 160, third-party systems 170, and networks 110, this disclosure contemplates any suitable number of users 101, client systems 130, social-networking systems 160, third-party systems 170, and networks 110. As an example and not by way of limitation, network environment 100 may include multiple client system 130, social-networking systems 160, third-party systems 170, and networks 110.

In particular embodiments, user 101 may be an individual (human user), an entity (e.g., an enterprise, business, or third-party application), or a group (e.g., of individuals or entities) that interacts or communicates with or over social-networking system 160. In particular embodiments, one or more users 101 may use one or more client systems 130 to access, send data to, and receive data from social-networking system 160 or third-party system 170.

This disclosure contemplates any suitable network 110. As an example and not by way of limitation, one or more portions of network 110 may include an ad hoc network, an intranet, an extranet, a virtual private network (VPN), a local area network (LAN), a wireless LAN (WLAN), a wide area network (WAN), a wireless WAN (WWAN), a metropolitan area network (MAN), a portion of the Internet, a portion of the Public Switched Telephone Network (PSTN), a cellular telephone network, or a combination of two or more of these. Network 110 may include one or more networks 110.

Links 150 may connect client system 130, social-networking system 160, and third-party system 170 to communication network 110 or to each other. This disclosure contemplates any suitable links 150. In particular embodiments, one or more links 150 include one or more wireline (such as for example Digital Subscriber Line (DSL) or Data Over Cable Service Interface Specification (DOCSIS)), wireless (such as for example Wi-Fi or Worldwide Interoperability for Microwave Access (WiMAX)), or optical (such as for example Synchronous Optical Network (SONET) or Synchronous Digital Hierarchy (SDH)) links. In particular embodiments, one or more links 150 each include an ad hoc network, an intranet, an extranet, a VPN, a LAN, a WLAN, a WAN, a WWAN, a MAN, a portion of the Internet, a portion of the PSTN, a cellular technology-based network, a satellite communications technology-based network, another link 150, or a combination of two or more such links 150. Links 150 need not necessarily be the same throughout network environment 100. One or more first links 150 may differ in one or more respects from one or more second links 150.

In particular embodiments, client system 130 may be an electronic device including hardware, software, or embedded logic components or a combination of two or more such components and capable of carrying out the appropriate functionalities implemented or supported by client system 130. As an example and not by way of limitation, a client system 130 may include a computer system such as a desktop computer, notebook or laptop computer, netbook, a tablet computer, e-book reader, GPS device, camera, personal digital assistant (PDA), handheld electronic device, cellular telephone, smartphone, augmented/virtual reality device, other suitable electronic device, or any suitable combination thereof. This disclosure contemplates any suitable client systems 130. A client system 130 may enable user 101 to access network 110. A client system 130 may enable its user 101 to communicate with other users 101 at other client systems 130.

In particular embodiments, social-networking system 160 may be a network-addressable computing system that can host an online social network. Social-networking system 160 may generate, store, receive, and send social-networking data, such as, for example, user-profile data, concept-profile data, social-graph information, or other suitable data related to the online social network. Social-networking system 160 may be accessed by the other components of network environment 100 either directly or via network 110. As an example and not by way of limitation, client system 130 may access social-networking system 160 using a web browser or a native application associated with social-networking system 160 (e.g., a mobile social-networking application, a messaging application, another suitable application, or any combination thereof) either directly or via network 110. In particular embodiments, social-networking system 160 may include one or more servers 162. Each server 162 may be a unitary server or a distributed server spanning multiple computers or multiple datacenters. Servers 162 may be of various types, such as, for example and without limitation, web server, news server, mail server, message server, advertising server, file server, application server, exchange server, database server, proxy server, another server suitable for performing functions or processes described herein, or any combination thereof. In particular embodiments, each server 162 may include hardware, software, or embedded logic components or a combination of two or more such components for carrying out the appropriate functionalities implemented or supported by server 162. In particular embodiments, social-networking system 160 may include one or more data stores 164. Data stores 164 may be used to store various types of information. In particular embodiments, the information stored in data stores 164 may be organized according to specific data structures. In particular embodiments, each data store 164 may be a relational, columnar, correlation, or other suitable database. Although this disclosure describes or illustrates particular types of databases, this disclosure contemplates any suitable types of databases. Particular embodiments may provide interfaces that enable a client system 130, a social-networking system 160, or a third-party system 170 to manage, retrieve, modify, add, or delete, the information stored in data store 164.

In particular embodiments, social-networking system 160 may store one or more social graphs (e.g., social graph 200) in one or more data stores 164. In particular embodiments, a social graph may include multiple nodes—which may include multiple user nodes (each corresponding to a particular user 101) or multiple concept nodes (each corresponding to a particular concept)—and multiple edges connecting the nodes. Social-networking system 160 may provide users 101 of the online social network the ability to communicate and interact with other users 101. In particular embodiments, users 101 may join the online social network via social-networking system 160 and then add connections (e.g., relationships) to a number of other users 101 of social-networking system 160 to whom they want to be connected. Herein, the term "friend" may refer to any other user 101 of social-networking system 160 with whom a user 101 has formed a connection, association, or relationship via social-networking system 160.

In particular embodiments, social-networking system 160 may provide users 101 with the ability to take actions on various types of items or objects, supported by social-networking system 160. As an example and not by way of limitation, the items and objects may include groups or social networks to which users of social-networking system 160 may belong, events or calendar entries in which a user might be interested, computer-based applications that a user may use, transactions that allow users to buy or sell items via the service, interactions with advertisements that a user may perform, or other suitable items or objects. A user may interact with anything that is capable of being represented in social-networking system 160 or by an external system of third-party system 170, which is separate from social-networking system 160 and coupled to social-networking system 160 via a network 110.

In particular embodiments, social-networking system 160 may be capable of linking a variety of entities. As an example and not by way of limitation, social-networking system 160 may enable users to interact with each other as well as receive content from third-party systems 170 or other entities, or to allow users to interact with these entities through an application programming interfaces (API) or other communication channels.

In particular embodiments, a third-party system 170 may include one or more types of servers, one or more data stores, one or more interfaces, including but not limited to APIs, one or more web services, one or more content sources, one or more networks, or any other suitable components, e.g., that servers may communicate with. A third-party system 170 may be operated by a different entity from an entity operating social-networking system 160. In particular embodiments, however, social-networking system 160 and third-party systems 170 may operate in conjunction with each other to provide social-networking services to users of social-networking system 160 or third-party systems 170. In this sense, social-networking system 160 may provide a platform, or backbone, which other systems, such as third-party systems 170, may use to provide social-networking services and functionality to users across the Internet.

In particular embodiments, a third-party system 170 may include a third-party content object provider. A third-party content object provider may include one or more sources of content objects, which may be communicated to a client system 130. As an example and not by way of limitation, content objects may include information regarding things or activities of interest to the user, such as, for example, movie show times, movie reviews, restaurant reviews, restaurant menus, product information and reviews, or other suitable information. As another example and not by way of limitation, content objects may include incentive content objects, such as coupons, discount tickets, gift certificates, or other suitable incentive objects.

In particular embodiments, social-networking system 160 also includes user-generated content objects, which may enhance a user's interactions with social-networking system 160. User-generated content may include anything a user can add, upload, send, or "post" to social-networking system 160. As an example and not by way of limitation, a user communicates posts to social-networking system 160 from a client system 130. Posts may include data such as status updates or other textual data, location information, photos, videos, links, music or other similar data or media. Content may also be added to social-networking system 160 by a third-party through a "communication channel," such as a newsfeed or stream.

In particular embodiments, social-networking system 160 may include a variety of servers, sub-systems, programs, modules, logs, and data stores. In particular embodiments, social-networking system 160 may include one or more of the following: a web server, action logger, API-request server, relevance-and-ranking engine, content-object classifier, notification controller, action log, third-party-content-object-exposure log, inference module, authorization/privacy server, search module, advertisement-targeting module, user-interface module, user-profile store, connection store, third-party content store, or location store. Social-networking system 160 may also include suitable components such as network interfaces, security mechanisms, load balancers, failover servers, management-and-network-operations consoles, other suitable components, or any suitable combination thereof. In particular embodiments, social-networking system 160 may include one or more user-profile stores for storing user profiles. A user profile may include, for example, biographic information, demographic information, behavioral information, social information, or other types of descriptive information, such as work experience, educational history, hobbies or preferences, interests, affinities, or location. Interest information may include interests related to one or more categories. Categories may be general or specific. As an example and not by way of limitation, if a user "likes" an article about a brand of shoes the category may be the brand, or the general category of "shoes" or "clothing." A connection store may be used for storing connection information about users. The connection information may indicate users who have similar or common work experience, group memberships, hobbies, educational history, or are in any way related or share common attributes. The connection information may also include user-defined connections between different users and content (both internal and external). A web server may be used for linking social-networking system 160 to one or more client systems 130 or one or more third-party system 170 via network 110. The web server may include a mail server or other messaging functionality for receiving and routing messages between social-networking system 160 and one or more client systems 130. An API-request server may allow a third-party system 170 to access information from social-networking system 160 by calling one or more APIs. An action logger may be used to receive communications from a web server about a user's actions on or off social-networking system 160. In conjunction with the action log, a third-party-content-object log may be maintained of user exposures to third-party-content objects. A notification controller may provide information regarding content objects to a client system 130. Information may be pushed to a client system 130 as notifications, or information may be pulled from client system 130 responsive to a request received from client system 130. Authorization servers may be used to enforce one or more privacy settings of the users of social-networking system 160. A privacy setting of a user determines how particular information associated with a user can be shared. The authorization server may allow users to opt in to or opt out of having their actions logged by social-networking system 160 or shared with other systems (e.g., third-party system 170), such as, for example, by setting appropriate privacy settings. Third-party-content-object stores may be used to store content objects received from third parties, such as a third-party system 170. Location stores may be used for storing location information received from client systems 130 associated with users. Advertisement-pricing modules may combine social information, the current time, location information, or other suitable information to provide relevant advertisements, in the form of notifications, to a user.

Figure 2:
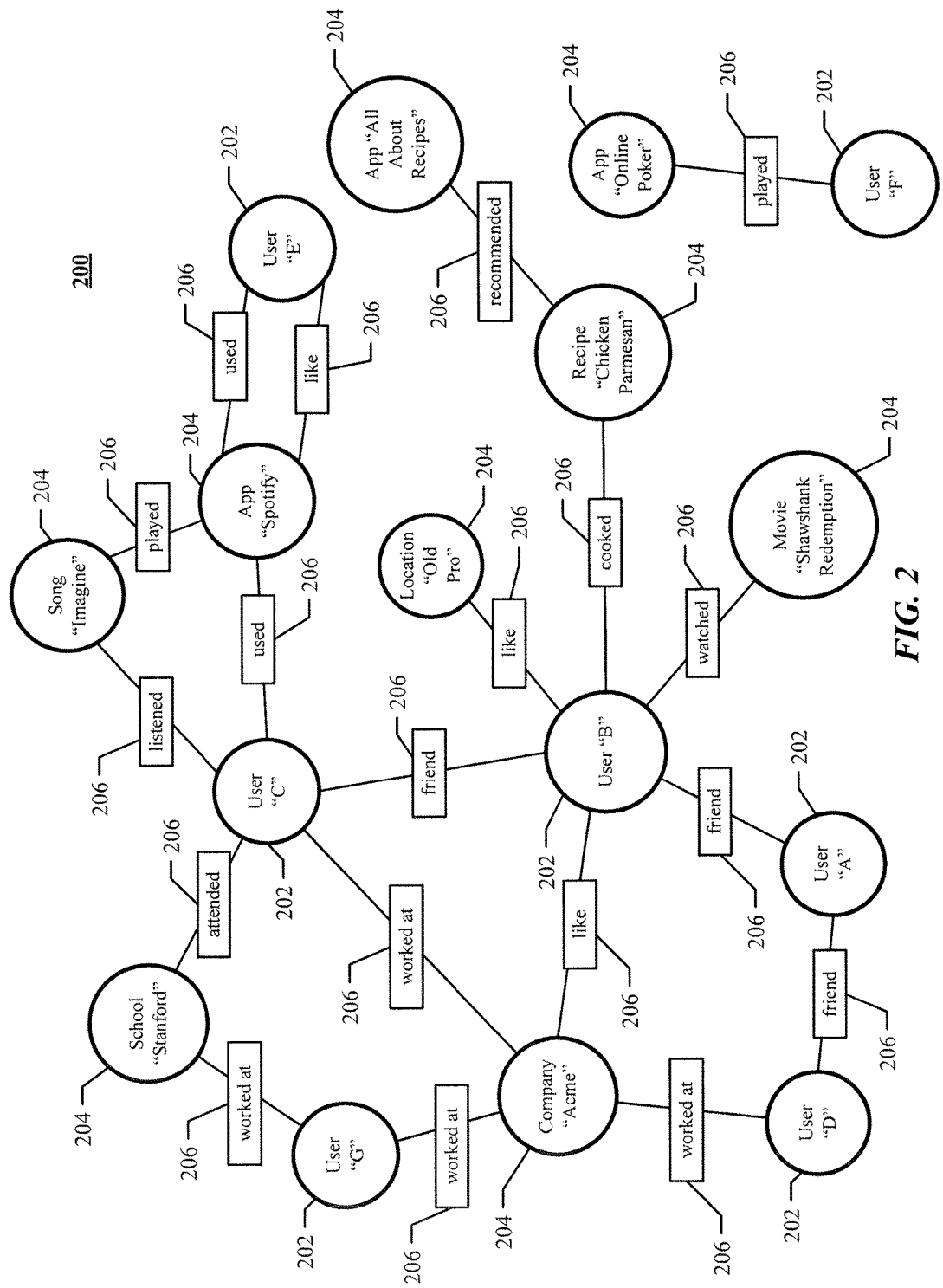
FIG. 2 illustrates an example social graph.

FIG. 2 illustrates an example social graph 200. In particular embodiments, social-networking system 160 may store one or more social graphs 200 in one or more data stores. In particular embodiments, social graph 200 may include multiple nodes—which may include multiple user nodes 202 or multiple concept nodes 204—and multiple edges 206 connecting the nodes. Example social graph 200 illustrated in FIG. 2 is shown, for didactic purposes, in a two-dimensional visual map representation. In particular embodiments, a social-networking system 160, client system 130, or third-party system 170 may access social graph 200 and related social-graph information for suitable applications. The nodes and edges of social graph 200 may be stored as data objects, for example, in a data store (such as a social-graph database). Such a data store may include one or more searchable or queryable indexes of nodes or edges of social graph 200.

In particular embodiments, a user node 202 may correspond to a user of social-networking system 160. As an example and not by way of limitation, a user may be an individual (human user), an entity (e.g., an enterprise, business, or third-party application), or a group (e.g., of individuals or entities) that interacts or communicates with or over social-networking system 160. In particular embodiments, when a user registers for an account with social-networking system 160, social-networking system 160 may create a user node 202 corresponding to the user, and store the user node 202 in one or more data stores. Users and user nodes 202 described herein may, where appropriate, refer to registered users and user nodes 202 associated with registered users. In addition or as an alternative, users and user nodes 202 described herein may, where appropriate, refer to users that have not registered with social-networking system 160. In particular embodiments, a user node 202 may be associated with information provided by a user or information gathered by various systems, including social-networking system 160. As an example and not by way of limitation, a user may provide his or her name, profile picture, contact information, birth date, sex, marital status, family status, employment, education background, preferences, interests, or other demographic information. In particular embodiments, a user node 202 may be associated with one or more data objects corresponding to information associated with a user. In particular embodiments, a user node 202 may correspond to one or more webpages.

In particular embodiments, a concept node 204 may correspond to a concept. As an example and not by way of limitation, a concept may correspond to a place (such as, for example, a movie theater, restaurant, landmark, or city); a website (such as, for example, a website associated with social-network system 160 or a third-party website associated with a web-application server); an entity (such as, for example, a person, business, group, sports team, or celebrity); a resource (such as, for example, an audio file, video file, digital photo, text file, structured document, or application) which may be located within social-networking system 160 or on an external server, such as a web-application server; real or intellectual property (such as, for example, a sculpture, painting, movie, game, song, idea, photograph, or written work); a game; an activity; an idea or theory; an object in a augmented/virtual reality environment; another suitable concept; or two or more such concepts. A concept node 204 may be associated with information of a concept provided by a user or information gathered by various systems, including social-networking system 160. As an example and not by way of limitation, information of a concept may include a name or a title; one or more images (e.g., an image of the cover page of a book); a location (e.g., an address or a geographical location); a website (which may be associated with a URL); contact information (e.g., a phone number or an email address); other suitable concept information; or any suitable combination of such information. In particular embodiments, a concept node 204 may be associated with one or more data objects corresponding to information associated with concept node 204. In particular embodiments, a concept node 204 may correspond to one or more webpages.

In particular embodiments, a node in social graph 200 may represent or be represented by a webpage (which may be referred to as a "profile page"). Profile pages may be hosted by or accessible to social-networking system 160. Profile pages may also be hosted on third-party websites associated with a third-party server 170. As an example and not by way of limitation, a profile page corresponding to a particular external webpage may be the particular external webpage and the profile page may correspond to a particular concept node 204. Profile pages may be viewable by all or a selected subset of other users. As an example and not by way of limitation, a user node 202 may have a corresponding user-profile page in which the corresponding user may add content, make declarations, or otherwise express himself or herself. As another example and not by way of limitation, a concept node 204 may have a corresponding concept-profile page in which one or more users may add content, make declarations, or express themselves, particularly in relation to the concept corresponding to concept node 204.

In particular embodiments, a concept node 204 may represent a third-party webpage or resource hosted by a third-party system 170. The third-party webpage or resource may include, among other elements, content, a selectable or other icon, or other inter-actable object (which may be implemented, for example, in JavaScript, AJAX, or PHP codes) representing an action or activity. As an example and not by way of limitation, a third-party webpage may include a selectable icon such as "like," "check-in," "eat," "recommend," or another suitable action or activity. A user viewing the third-party webpage may perform an action by selecting one of the icons (e.g., "check-in"), causing a client system 130 to send to social-networking system 160 a message indicating the user's action. In response to the message, social-networking system 160 may create an edge (e.g., a check-in-type edge) between a user node 202 corresponding to the user and a concept node 204 corresponding to the third-party webpage or resource and store edge 206 in one or more data stores.

In particular embodiments, a pair of nodes in social graph 200 may be connected to each other by one or more edges 206. An edge 206 connecting a pair of nodes may represent a relationship between the pair of nodes. In particular embodiments, an edge 206 may include or represent one or more data objects or attributes corresponding to the relationship between a pair of nodes. As an example and not by way of limitation, a first user may indicate that a second user is a "friend" of the first user. In response to this indication, social-networking system 160 may send a "friend request" to the second user. If the second user confirms the "friend request," social-networking system 160 may create an edge 206 connecting the first user's user node 202 to the second user's user node 202 in social graph 200 and store edge 206 as social-graph information in one or more of data stores 164. In the example of FIG. 2, social graph 200 includes an edge 206 indicating a friend relation between user nodes 202 of user "A" and user "B" and an edge indicating a friend relation between user nodes 202 of user "C" and user "B."

Although this disclosure describes or illustrates particular edges 206 with particular attributes connecting particular user nodes 202, this disclosure contemplates any suitable edges 206 with any suitable attributes connecting user nodes 202. As an example and not by way of limitation, an edge 206 may represent a friendship, family relationship, business or employment relationship, fan relationship (including, e.g., liking, etc.), follower relationship, visitor relationship (including, e.g., accessing, viewing, checking-in, sharing, etc.), subscriber relationship, superior/subordinate relationship, reciprocal relationship, non-reciprocal relationship, another suitable type of relationship, or two or more such relationships. Moreover, although this disclosure generally describes nodes as being connected, this disclosure also describes users or concepts as being connected. Herein, references to users or concepts being connected may, where appropriate, refer to the nodes corresponding to those users or concepts being connected in social graph 200 by one or more edges 206.

In particular embodiments, an edge 206 between a user node 202 and a concept node 204 may represent a particular action or activity performed by a user associated with user node 202 toward a concept associated with a concept node 204. As an example and not by way of limitation, as illustrated in FIG. 2, a user may "like," "attended," "played," "listened," "cooked," "worked at," or "watched" a concept, each of which may correspond to an edge type or subtype. A concept-profile page corresponding to a concept node 204 may include, for example, a selectable "check in" icon (such as, for example, a clickable "check in" icon) or a selectable "add to favorites" icon. Similarly, after a user clicks these icons, social-networking system 160 may create a "favorite" edge or a "check in" edge in response to a user's action corresponding to a respective action. As another example and not by way of limitation, a user (user "C") may listen to a particular song ("Imagine") using a particular application (SPOTIFY, which is an online music application). In this case, social-networking system 160 may create a "listened" edge 206 and a "used" edge (as illustrated in FIG. 2) between user nodes 202 corresponding to the user and concept nodes 204 corresponding to the song and application to indicate that the user listened to the song and used the application. Moreover, social-networking system 160 may create a "played" edge 206 (as illustrated in FIG. 2) between concept nodes 204 corresponding to the song and the application to indicate that the particular song was played by the particular application. In this case, "played" edge 206 corresponds to an action performed by an external application (SPOTIFY) on an external audio file (the song "Imagine"). Although this disclosure describes particular edges 206 with particular attributes connecting user nodes 202 and concept nodes 204, this disclosure contemplates any suitable edges 206 with any suitable attributes connecting user nodes 202 and concept nodes 204. Moreover, although this disclosure describes edges between a user node 202 and a concept node 204 representing a single relationship, this disclosure contemplates edges between a user node 202 and a concept node 204 representing one or more relationships. As an example and not by way of limitation, an edge 206 may represent both that a user likes and has used at a particular concept. Alternatively, another edge 206 may represent each type of relationship (or multiples of a single relationship) between a user node 202 and a concept node 204 (as illustrated in FIG. 2 between user node 202 for user "E" and concept node 204 for "SPOTIFY").

In particular embodiments, social-networking system 160 may create an edge 206 between a user node 202 and a concept node 204 in social graph 200. As an example and not by way of limitation, a user viewing a concept-profile page (such as, for example, by using a web browser or a special-purpose application hosted by the user's client system 130) may indicate that he or she likes the concept represented by the concept node 204 by clicking or selecting a "Like" icon, which may cause the user's client system 130 to send to social-networking system 160 a message indicating the user's liking of the concept associated with the concept-profile page. In response to the message, social-networking system 160 may create an edge 206 between user node 202 associated with the user and concept node 204, as illustrated by "like" edge 206 between the user and concept node 204. In particular embodiments, social-networking system 160 may store an edge 206 in one or more data stores. In particular embodiments, an edge 206 may be automatically formed by social-networking system 160 in response to a particular user action. As an example and not by way of limitation, if a first user uploads a picture, watches a movie, or listens to a song, an edge 206 may be formed between user node 202 corresponding to the first user and concept nodes 204 corresponding to those concepts. Although this disclosure describes forming particular edges 206 in particular manners, this disclosure contemplates forming any suitable edges 206 in any suitable manner.

In particular embodiments, social-networking system 160 may determine the social-graph affinity (which may be referred to herein as "affinity") of various social-graph entities for each other. Affinity may represent the strength of a relationship or level of interest between particular objects associated with the online social network, such as users, concepts, content, actions, advertisements, other objects associated with the online social network, or any suitable combination thereof. Affinity may also be determined with respect to objects associated with third-party systems 170 or other suitable systems. An overall affinity for a social-graph entity for each user, subject matter, or type of content may be established. The overall affinity may change based on continued monitoring of the actions or relationships associated with the social-graph entity. Although this disclosure describes determining particular affinities in a particular manner, this disclosure contemplates determining any suitable affinities in any suitable manner.

In particular embodiments, social-networking system 160 may measure or quantify social-graph affinity using an affinity coefficient (which may be referred to herein as "coefficient"). The coefficient may represent or quantify the strength of a relationship between particular objects associated with the online social network. The coefficient may also represent a probability or function that measures a predicted probability that a user will perform a particular action based on the user's interest in the action. In this way, a user's future actions may be predicted based on the user's prior actions, where the coefficient may be calculated at least in part on the history of the user's actions. Coefficients may be used to predict any number of actions, which may be within or outside of the online social network. As an example and not by way of limitation, these actions may include various types of communications, such as sending messages, posting content, or commenting on content; various types of a observation actions, such as accessing or viewing profile pages, media, or other suitable content; various types of coincidence information about two or more social-graph entities, such as being in the same group, tagged in the same photograph, checked-in at the same location, or attending the same event; or other suitable actions. Although this disclosure describes measuring affinity in a particular manner, this disclosure contemplates measuring affinity in any suitable manner.

In particular embodiments, social-networking system 160 may use a variety of factors to calculate a coefficient. These factors may include, for example, user actions, types of relationships between objects, location information, other suitable factors, or any combination thereof. In particular embodiments, different factors may be weighted differently when calculating the coefficient. The weights for each factor may be static or the weights may change according to, for example, the user, the type of relationship, the type of action, the user's location, and so forth. Ratings for the factors may be combined according to their weights to determine an overall coefficient for the user. As an example and not by way of limitation, particular user actions may be assigned both a rating and a weight while a relationship associated with the particular user action is assigned a rating and a correlating weight (e.g., so the weights total 100%). To calculate the coefficient of a user towards a particular object, the rating assigned to the user's actions may comprise, for example, 60% of the overall coefficient, while the relationship between the user and the object may comprise 40% of the overall coefficient. In particular embodiments, the social-networking system 160 may consider a variety of variables when determining weights for various factors used to calculate a coefficient, such as, for example, the time since information was accessed, decay factors, frequency of access, relationship to information or relationship to the object about which information was accessed, relationship to social-graph entities connected to the object, short- or long-term averages of user actions, user feedback, other suitable variables, or any combination thereof. As an example and not by way of limitation, a coefficient may include a decay factor that causes the strength of the signal provided by particular actions to decay with time, such that more recent actions are more relevant when calculating the coefficient. The ratings and weights may be continuously updated based on continued tracking of the actions upon which the coefficient is based. Any type of process or algorithm may be employed for assigning, combining, averaging, and so forth the ratings for each factor and the weights assigned to the factors. In particular embodiments, social-networking system 160 may determine coefficients using machine-learning algorithms trained on historical actions and past user responses, or data farmed from users by exposing them to various options and measuring responses. Although this disclosure describes calculating coefficients in a particular manner, this disclosure contemplates calculating coefficients in any suitable manner.

In particular embodiments, social-networking system 160 may calculate a coefficient based on a user's actions. Social-networking system 160 may monitor such actions on the online social network, on a third-party system 170, on other suitable systems, or any combination thereof. Any suitable type of user actions may be tracked or monitored. Typical user actions include viewing profile pages, creating or posting content, interacting with content, tagging or being tagged in images, joining groups, listing and confirming attendance at events, checking-in at locations, liking particular pages, creating pages, and performing other tasks that facilitate social action. In particular embodiments, social-networking system 160 may calculate a coefficient based on the user's actions with particular types of content. The content may be associated with the online social network, a third-party system 170, or another suitable system. The content may include users, profile pages, posts, news stories, headlines, instant messages, chat room conversations, emails, advertisements, pictures, video, music, other suitable objects, or any combination thereof. Social-networking system 160 may analyze a user's actions to determine whether one or more of the actions indicate an affinity for subject matter, content, other users, and so forth. As an example and not by way of limitation, if a user frequently posts content related to "coffee" or variants thereof, social-networking system 160 may determine the user has a high coefficient with respect to the concept "coffee". Particular actions or types of actions may be assigned a higher weight and/or rating than other actions, which may affect the overall calculated coefficient. As an example and not by way of limitation, if a first user emails a second user, the weight or the rating for the action may be higher than if the first user simply views the user-profile page for the second user.

In particular embodiments, social-networking system 160 may calculate a coefficient based on the type of relationship between particular objects. Referencing the social graph 200, social-networking system 160 may analyze the number and/or type of edges 206 connecting particular user nodes 202 and concept nodes 204 when calculating a coefficient. As an example and not by way of limitation, user nodes 202 that are connected by a spouse-type edge (representing that the two users are married) may be assigned a higher coefficient than a user nodes 202 that are connected by a friend-type edge. In other words, depending upon the weights assigned to the actions and relationships for the particular user, the overall affinity may be determined to be higher for content about the user's spouse than for content about the user's friend. In particular embodiments, the relationships a user has with another object may affect the weights and/or the ratings of the user's actions with respect to calculating the coefficient for that object. As an example and not by way of limitation, if a user is tagged in a first photo, but merely likes a second photo, social-networking system 160 may determine that the user has a higher coefficient with respect to the first photo than the second photo because having a tagged-in-type relationship with content may be assigned a higher weight and/or rating than having a like-type relationship with content. In particular embodiments, social-networking system 160 may calculate a coefficient for a first user based on the relationship one or more second users have with a particular object. In other words, the connections and coefficients other users have with an object may affect the first user's coefficient for the object. As an example and not by way of limitation, if a first user is connected to or has a high coefficient for one or more second users, and those second users are connected to or have a high coefficient for a particular object, social-networking system 160 may determine that the first user should also have a relatively high coefficient for the particular object. In particular embodiments, the coefficient may be based on the degree of separation between particular objects. The lower coefficient may represent the decreasing likelihood that the first user will share an interest in content objects of the user that is indirectly connected to the first user in the social graph 200. As an example and not by way of limitation, social-graph entities that are closer in the social graph 200 (i.e., fewer degrees of separation) may have a higher coefficient than entities that are further apart in the social graph 200.

In particular embodiments, social-networking system 160 may calculate a coefficient based on location information. Objects that are geographically closer to each other may be considered to be more related or of more interest to each other than more distant objects. In particular embodiments, the coefficient of a user towards a particular object may be based on the proximity of the object's location to a current location associated with the user (or the location of a client system 130 of the user). A first user may be more interested in other users or concepts that are closer to the first user. As an example and not by way of limitation, if a user is one mile from an airport and two miles from a gas station, social-networking system 160 may determine that the user has a higher coefficient for the airport than the gas station based on the proximity of the airport to the user.

In particular embodiments, social-networking system 160 may perform particular actions with respect to a user based on coefficient information. Coefficients may be used to predict whether a user will perform a particular action based on the user's interest in the action. A coefficient may be used when generating or presenting any type of objects to a user, such as advertisements, search results, news stories, media, messages, notifications, or other suitable objects. The coefficient may also be utilized to rank and order such objects, as appropriate. In this way, social-networking system 160 may provide information that is relevant to user's interests and current circumstances, increasing the likelihood that they will find such information of interest. In particular embodiments, social-networking system 160 may generate content based on coefficient information. Content objects may be provided or selected based on coefficients specific to a user. As an example and not by way of limitation, the coefficient may be used to generate media for the user, where the user may be presented with media for which the user has a high overall coefficient with respect to the media object. As another example and not by way of limitation, the coefficient may be used to generate advertisements for the user, where the user may be presented with advertisements for which the user has a high overall coefficient with respect to the advertised object. In particular embodiments, social-networking system 160 may generate search results based on coefficient information. Search results for a particular user may be scored or ranked based on the coefficient associated with the search results with respect to the querying user. As an example and not by way of limitation, search results corresponding to objects with higher coefficients may be ranked higher on a search-results page than results corresponding to objects having lower coefficients.

In particular embodiments, social-networking system 160 may calculate a coefficient in response to a request for a coefficient from a particular system or process. To predict the likely actions a user may take (or may be the subject of) in a given situation, any process may request a calculated coefficient for a user. The request may also include a set of weights to use for various factors used to calculate the coefficient. This request may come from a process running on the online social network, from a third-party system 170 (e.g., via an API or other communication channel), or from another suitable system. In response to the request, social-networking system 160 may calculate the coefficient (or access the coefficient information if it has previously been calculated and stored). In particular embodiments, social-networking system 160 may measure an affinity with respect to a particular process. Different processes (both internal and external to the online social network) may request a coefficient for a particular object or set of objects. Social-networking system 160 may provide a measure of affinity that is relevant to the particular process that requested the measure of affinity. In this way, each process receives a measure of affinity that is tailored for the different context in which the process will use the measure of affinity.

In connection with social-graph affinity and affinity coefficients, particular embodiments may utilize one or more systems, components, elements, functions, methods, operations, or steps disclosed in U.S. patent application Ser. No. 11/503,093, filed 11 Aug. 2006, U.S. patent application Ser. No. 12/977,027, filed 22 Dec. 2010, U.S. patent application Ser. No. 12/978,265, filed 23 Dec. 2010, and U.S. patent application Ser. No. 13/632,869, filed 1 Oct. 2012, each of which is incorporated by reference.

FIGS. 3A-3K illustrate various interfaces 310 (i.e., interfaces 310A-B) related to scheduling live videos. Interfaces 310 may be displayed to users 101 using any appropriate client system 130. For example, interfaces 310 may be displayed on a smartphone 130.

In general, interfaces 310 of FIGS. 3A-3K may be displayed to one or more users 101 in order to schedule or view live videos on client system 130. Instead of immediately broadcasting a live video to their friends, user 101 may select to schedule the live video to be broadcast at a future start time. Friends or other connections of user 101 may then receive one or more notifications on their client systems 130 that allow them to view details about the scheduled live video and begin watching the live video when it is available. As a result, many drawbacks of immediately broadcasting live videos (as opposed to scheduling live videos) may be eliminated or reduced. For example, user 101 is able to announce their live video in advance of its broadcast and thus more friends of user 101 may be informed about the live video. This may result in more viewers who view the scheduled live video than if it was spontaneously broadcast. This may be especially desirable for celebrity and corporate users 101 to promote their products and services. In addition, spontaneously broadcast live videos (i.e., those that were not scheduled in advance) may suffer from poor viewership at the start of the live video due to the lack of advance notice to viewers. By scheduling the live video for a future start time, however, viewership at the start of the live video may be increased and thus more viewers will be able to avoid missing the opening content of the live video. This may also help the broadcaster to start strong and avoid having a cold start to the live video.

As a specific example, consider the scenario where a celebrity artist (e.g., Taylor Swift as illustrated in FIGS. 3A-4D) wishes to promote their new song that was just released or will soon be released to the public. In order to promote the song, the celebrity artist may schedule a live video to be broadcast at a future start time and include a teaser such as "Tune in tomorrow at noon to view my live video about my new song." Each user 101 of social networking system 160 that is connected to the celebrity artist (e.g., friends of the celebrity artist or users 101 who have previously chosen to follow the celebrity artist) may then receive one or more notifications with the teaser about the upcoming live video. As a result, more of the celebrity artist's friends and followers on social networking system 160 may have advance notice about the live video. Thus, the live video may be viewed by more users 101 and sales of the new song may increase. While FIGS. 3A-4D illustrate a celebrity user 101 in reference to interfaces 310, any appropriate user 101 (e.g., non-celebrities, corporations, etc.) may utilize interfaces 310 to schedule live videos.

As used herein, a "live video" may refer to a video stream or any other form of multimedia that is transmitted over a network such as the Internet in real time or in near real time. For example, rather than wait for the entire video to arrive before making it available to other users 101, a computing system of social networking system 160 (e.g., server 162)

may continuously receive/capture the received live video stream from client system 130 and immediately broadcast it to other users 101 of social networking system 160. In some embodiments, client system 130 may capture the live video stream by using a video camera, microphone, speaker, or any other mechanism to record video and/or audio. In certain embodiments, a video stream may comprise a video component, an audio component, or both a video and audio component. Multiple other users 101 of social networking system 160 may simultaneously view the live video using, for example, a mobile application or website of social networking system 160.

Figures 3A, 3B:
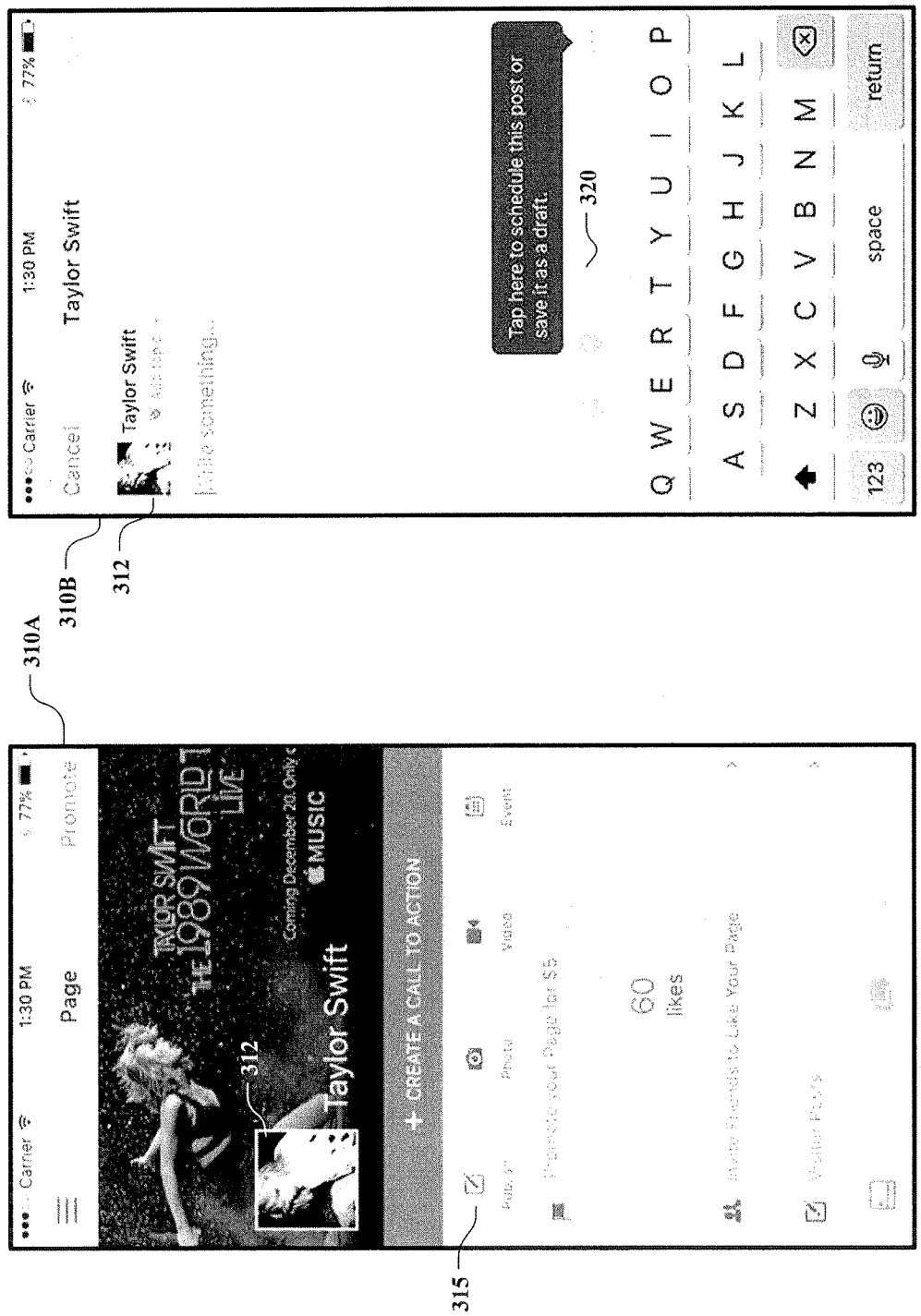

FIG. 3A illustrates a home page interface 310A for user 101. In general, home page interface 310A provides user 101 with an interface (e.g., timeline) to view content such as posts from other users of social networking system 160 (e.g., from their friends) and to publish content (e.g., posts) to social networking system 160. In some embodiments, home page interface 310A includes a profile image 312 for user 101 and a selectable element 315 that permits user 101 to create content and publish it to social networking system 160. In this example, selecting element 315 causes another interface 310 (e.g., interface 310B in FIG. 3B) to be displayed to user 101 on client systems 130.

FIG. 3B illustrates a composer interface 310B that may be used by user 101 to create content to be published to social networking system 160. For example, user 101 may utilize interface 310B to publish a message, a photo, a location, or a live video to social networking system 160 that may then be viewed by their friends and other connections on networking system 160. In some embodiments, composer interface may include a selectable element 320 that allows user 101 to publish a live video to social networking system 160. Selecting element 320 may cause interface 310B to display content to user 101 on client systems 130 as illustrated in FIG. 3C.

Figures 3C, 3D:
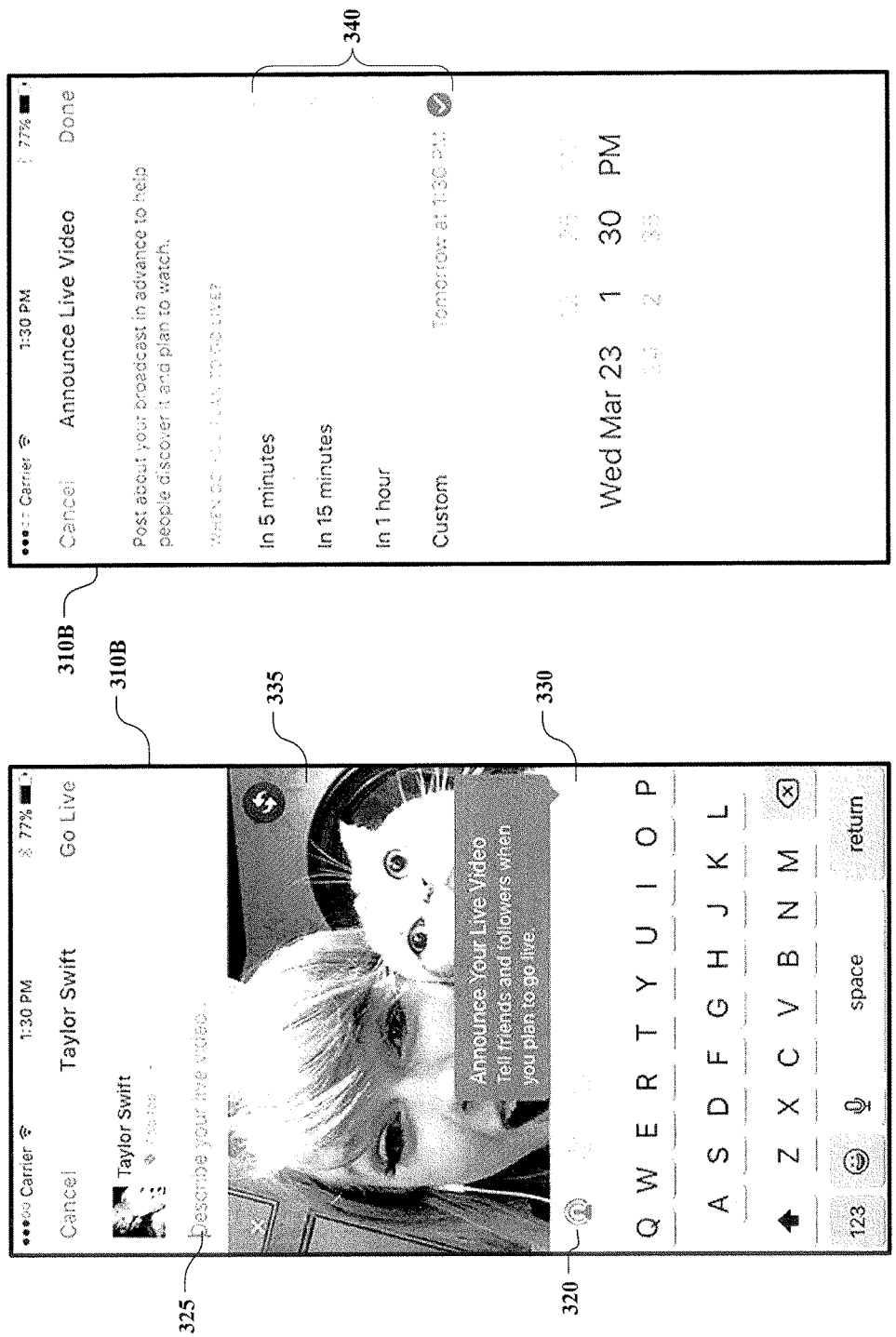

FIG. 3C illustrates another view of composer interface 310B that may be used by user 101 to schedule a live video for publishing to social networking system 160. In some embodiments, composer interface 310B as shown in FIG. 3C includes an area 325, a selectable element 330, and an image 335. Area 325 is an input area that allows user 101 to provide a textual description of the live video (e.g., a teaser). Selectable element 330 is any graphical user interface element that permits user 101 to view and select options (e.g., options 340 in FIG. 3D) for scheduling the live video to be broadcast at a future start time. Image 335 is any image chosen by user 101 or social networking 160 to represent the live video of user 101.

FIG. 3D illustrates options 340 displayed in composer interface 310B. Options 340 permit user 101 to schedule their live video to be broadcast at a future start time. Options 340 may include any appropriate options or time periods. For example, options 340 may in some embodiments include various amounts of time in the future from the current date and time (e.g., "In 5 minutes") and an option to begin broadcasting the live video at a specific future date and time (e.g., "Wed March 23 1:30 PM"). While specific options 340 are illustrated in FIG. 3D, other embodiments may include any appropriate date/time options for scheduling live videos. Once user 101 has selected the desired option 340, they may select "Done" in order to return to composer interface 310B as illustrated in FIG. 3E.

In some embodiments, composer interface 310B may include one or more selectable options 340 to begin or end broadcasting the live video based on other events. For example, the start/end of the live video may be based on a trigger as determined from social graph 200. As another example, the start/end of the live video may be based on the start/end of an event such as a live sporting event. In some embodiments, composer interface 310B may include one or more selectable options 340 to schedule a private or a one-on-one live video with one or more specific users 101 of social networking system 160. For example, one or more specific friends 101 of user 101 may be selected to view a live video, and only the chosen friends may be allowed to view the live video. In some embodiments, the selected friends 101 may be provided with a code or password to view the live video.

Figures 3E, 3F:
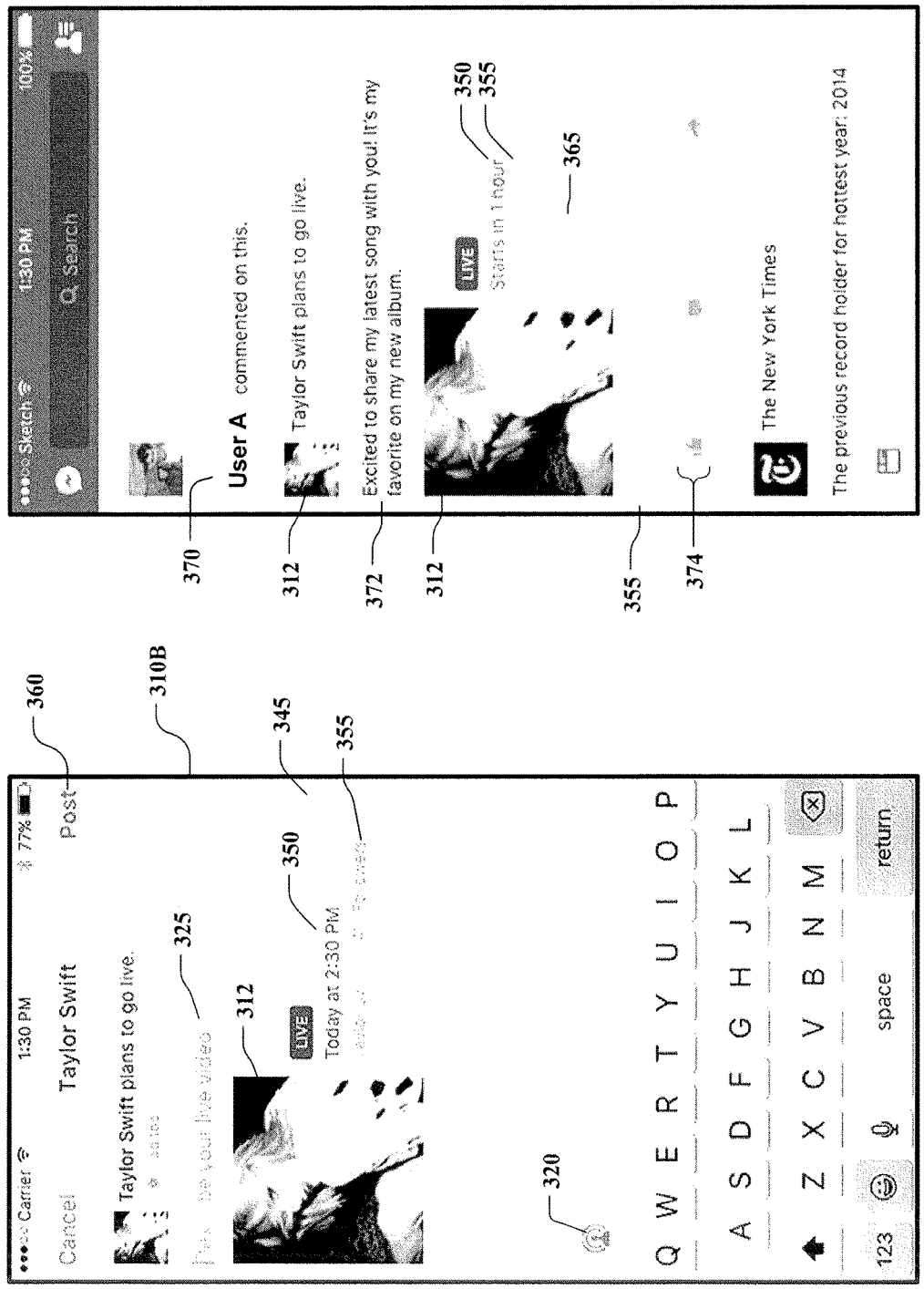

FIG. 3E illustrates composer interface 310B after user 101 has selected one of options 340 to schedule their live video to be broadcast at a future start time. In this view, composer interface 310B includes a preview 345 of a post announcing the future live video. In other words, preview 345 displays to user 101 how the post about their scheduled live video will appear to their friends and followers on social networking system 160. In this example, post preview 345 includes profile image 312, information 350 about the live video (e.g., the start time of the live video), and social information 355. Social information 355 may be any information from social graph 200 that is related to user 101. For example, social information 355 may indicate the name of user 101 and the number of followers or friends of user 101 on social networking system 160. Once user 101 is ready to submit the post about their live video to social networking system 160, they may select an element within composer interface 310B such as post element 360. A post announcing the future live video, such as post 370 as illustrated in FIG. 3F, may then be available to friends and followers of user 101 on social networking system 160 (e.g., in their timelines).

FIG. 3F illustrates a post 370 about the future live video of user 101. Post 370 may be displayed to user 101, friends and followers of user 101 within social networking system 160, or any other appropriate users 101 of social networking system 160. In some embodiments, user 101 may choose to promote post 370 to specific users of social networking system 160 who are not already friends or followers of user 101. For example, user 101 may choose to promote, for a cost, post 370 to other users 101 based on certain criteria (e.g., users 101 within a certain geographic location, users 101 with connections in social graph 200 to content that is similar to content associated with user 101, etc.).

In some embodiments, post 370 may include a teaser 372, profile image 312, live video information 350, social information 355, a follow option 365, and one or more social options 374. Teaser 372 is any textual description or information about the live video provided by user 101. For example, teaser 372 may be a description of the live video (e.g., "Excited to share my latest song with you! It's my favorite on my new album.") entered into area 325. Social information 355 may include the number of users 101 of social networking system 160 that have "liked" post 370 or who have commented on post 370. Social options 374 may provide users 101 with various options to react to post 370. For example, social options 374 may include an option to like post 370, an option to comment on post 370, and an option to share post 370 with other friends or users 101 of social networking system 160. Follow option 365 is any selectable option that users 101 may select to receive a future notification about the live video. For example, by selecting follow option 365, users 101 may receive one or more future notifications about the live video such as notifications 380 as illustrated in FIGS. 3H and 3I.

Figures 3G, 3H, 3I:
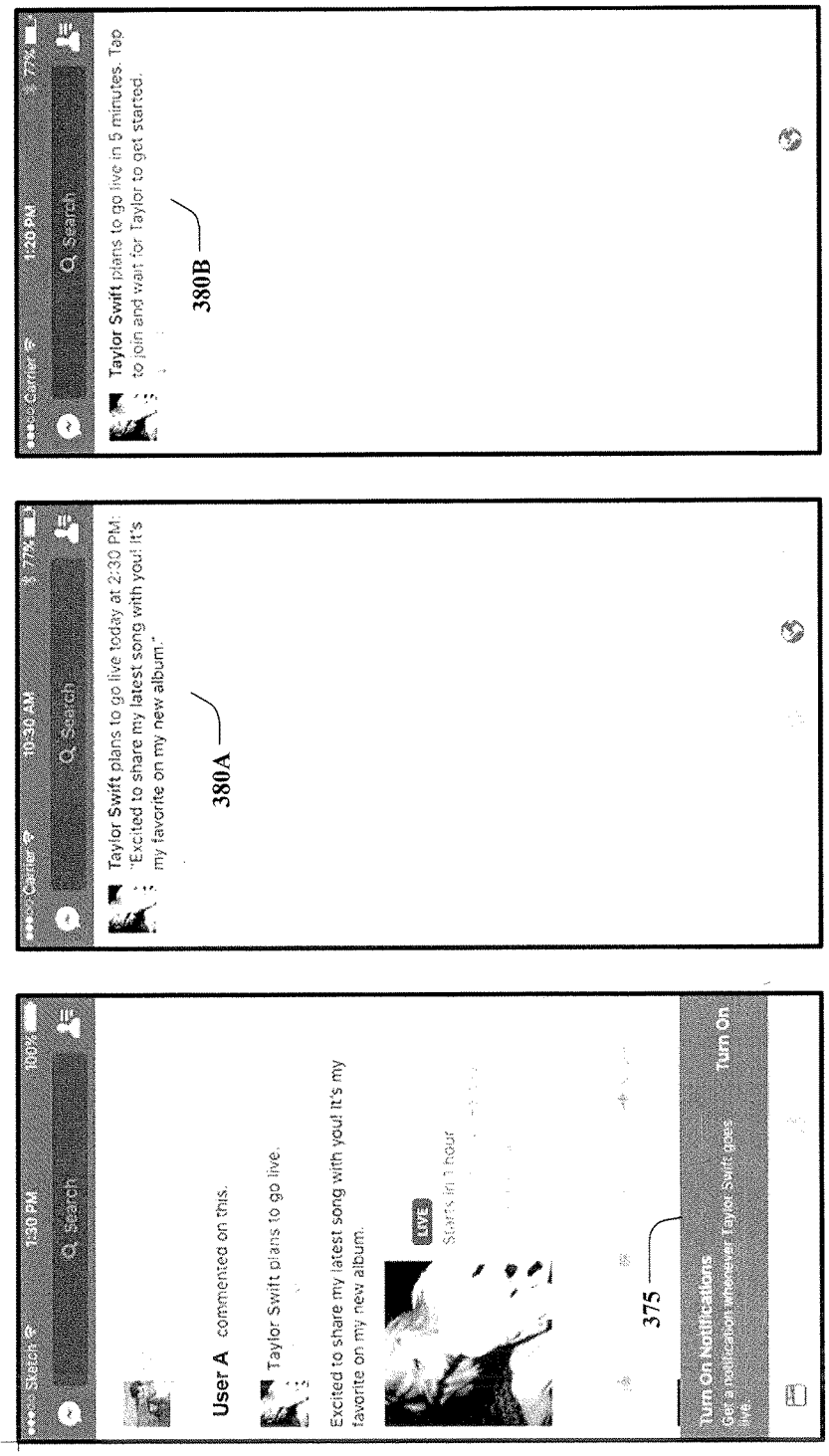

In some embodiments, if follow option 365 is selected by user 101, an opt-in option 375 as shown in FIG. 3G may be displayed to user 101 to allow user 101 to approve receiving any future notifications about the live video. By selecting opt-in option 375 or an element within opt-in option 375 (or otherwise within composer interface 310B), user 101 may then receive a notification when the live video is currently available for viewing (e.g., post 390B in FIG. 3K), a notification a predetermined amount of time before the start time when a lobby interface for the live video is available (e.g., post 390A in FIG. 3J or notification 380B), or any other appropriate notification about the live video (e.g., notification 380A in FIG. 3H).

Figures 4A, 4B:
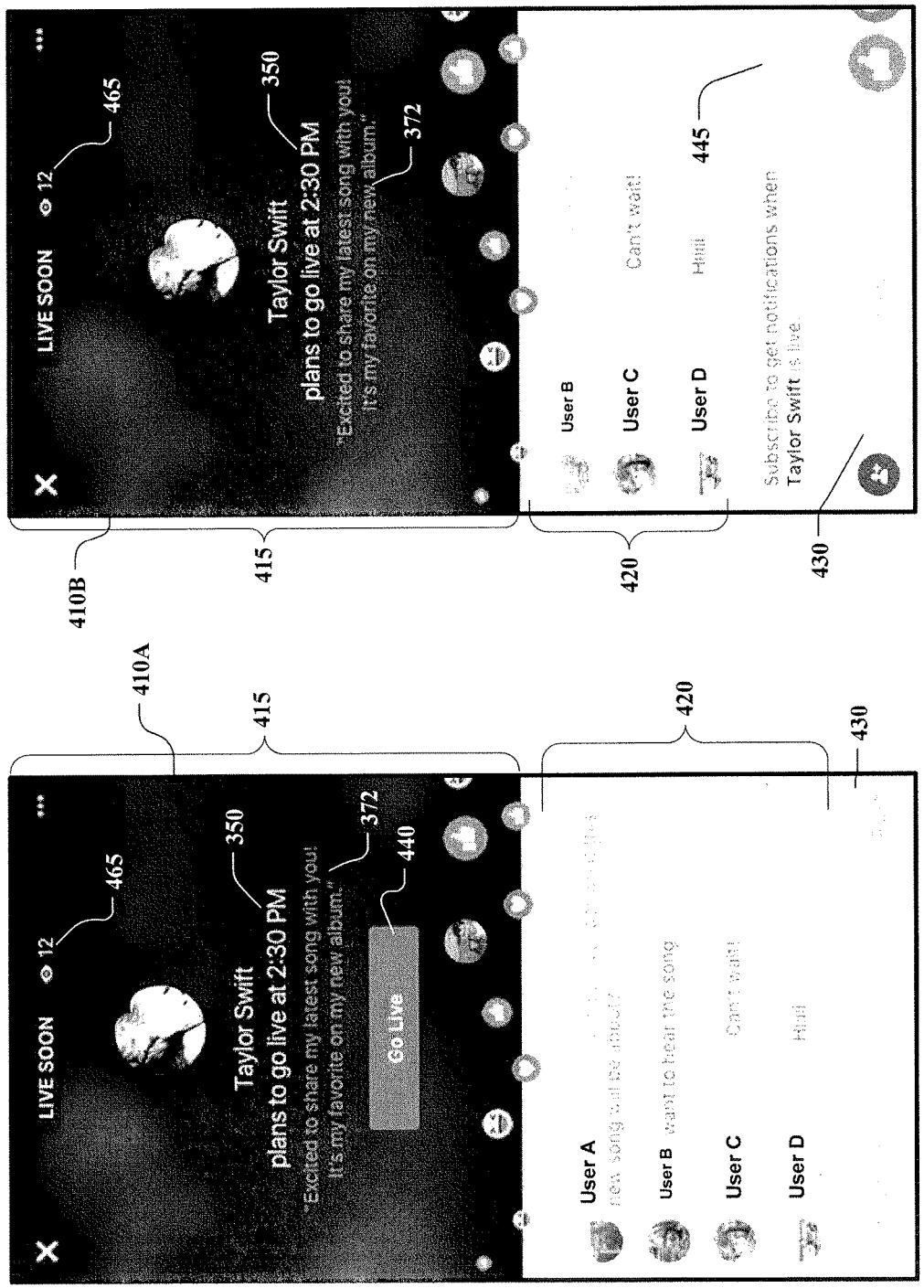
FIGS. 4A-4D illustrate various interfaces for viewing live videos.

FIGS. 3H-3I illustrate various notifications 380 (e.g., notifications 380A and 380B) that users 101 may receive about a live video. For example, if a user 101 chooses follow option 365 (FIG. 3F) or opt-in option 375 (FIG. 3G), user 101 may receive one or more notifications 380 about the live video. Notification 380A is a notification that may be sent to users 101 a predetermined amount of time before the scheduled start time of the live video, but before a lobby interface for the live video (e.g., as shown in FIG. 4B) is available. For example, if the live video is scheduled to be broadcast at 2:30 PM on Wednesday, March 23, notification 380A may be sent to users 101 on Wednesday, March 23 at some pre-determined time before the lobby interface for the live video is available.

Notification 380B is a notification that may be sent to users 101 when a lobby interface for the live video (e.g., as shown in FIG. 4B) is available. For example, if a lobby interface for the live video opens at 2:25 PM (i.e., five minutes before the scheduled live video time of 2:30 PM), notification 380B may be sent to users 101 at 2:25 PM to inform them that the lobby is available. In some embodiments, notification 380B may be selected (or may include a selectable option) to view a lobby interface for the live video such as lobby interface 410B as illustrated in FIG. 4B. Various embodiments of lobby interfaces 410 for live videos are discussed below in reference to FIGS. 4A-4B.

FIGS. 3J-3K illustrate various posts 390 (e.g., 390A-B) that may notify users 101 when a live video or a lobby interface for a live video is available. For example, post 390A may appear in the timelines of users 101 when a lobby interface for the live video (e.g., lobby interface 410B) is available. In some embodiments, the lobby interface may be available a certain pre-determined amount of time before the scheduled start time of the live video (e.g., five minutes before the scheduled start time). In some embodiments, post 390A may include a selectable join option 395 that may cause a lobby interface such as lobby interface 410B to be displayed.

Post 390B is any post or notification that may be displayed to users 101 (e.g., in their timelines) at or after the start time of a live video. Post 390B may include image 335 that, once selected, may cause the live video to begin playing in place of image 335, in a full screen on client system 130, or in a separate interface (e.g., live video interface 450 in FIGS. 4C-4D) on any appropriate display device.

FIGS. 4A-4B illustrate lobby interfaces 410 (i.e., 410A-B) that may be displayed to users 101 a pre-determined amount of time before the scheduled start time of a live video. For example, if the live video is scheduled to be broadcast at 2:30 PM on March 23, lobby interfaces 410 may become available for viewing at 2:25 PM on March 23 (i.e., five minutes before the start time). Lobby interface 410A of FIG. 4A, which may be referred to as a broadcaster interface, may be displayed to the particular user 101 who scheduled the live video (e.g., Taylor Swift), and lobby interface 410B of FIG. 4B may be displayed to the users 101 of social networking system 160 who have chosen to view the live video.

In general, lobby interfaces 410 provide interfaces for viewers of a live video to congregate a certain amount of time before the scheduled start of a live video. For example, lobby interfaces 410 may become available for viewing five minutes before the scheduled start of a live video. Lobby interfaces 410 provide numerous benefits to both to the user who scheduled the live video (i.e., the broadcaster) and to users 101 who have chosen to view the live video. For example, by providing an area to view and post comments, viewers 101 can interact with other viewers 101 before the start of the live video. This may increase viewership at the start of the live video and may help the broadcaster to have a strong start. In addition, the broadcaster (i.e., Taylor Swift in the illustrated embodiments) may be able to view the posted comments and then respond either with their own comments or in their live video when it begins.

In some embodiments, lobby interfaces 410 include a display area 415, a comment area 420, a comment composer 430, a view amount 465, and teaser 372. Display area 415, which may be above comment area 420 or any other appropriate location in lobby interfaces 410, may include one or more of an image (e.g., profile image 312 of the broadcaster), a pre-recorded video such as a video provided by the broadcaster, an advertisement, or any other content. Comment area 420 is an area where comments of users 101 who are currently viewing lobby interface 410 or the live video (e.g., live video 460) may be viewed. Comment composer 430 is an area where comments of the broadcaster or any user 101 currently viewing lobby interface 410 or the live video (e.g., live video 460) may be composed and posted. View amount 465 is any appropriate indication of how many users 101 are currently viewing the lobby interface 410 or the live video.

In some embodiments, lobby interface 410A for the broadcaster may include one or more options to moderate or filter the comments that are displayed in comment area 420. For example, the broadcaster may be presented with selectable options to pin comments (i.e., force a comment to stay at the top of the displayed comments) or to filter the comments based on selectable criteria. For example, the broadcaster may choose to only show comments from users 101 who have previously liked the live video or the broadcaster. Any appropriate options for moderating and filtering comments may be included.

In some embodiments, lobby interface 410A that is displayed to the broadcaster includes a Go Live option 440. Go Live option 440 is any appropriate selectable element that enables the broadcaster to begin broadcasting their live video to their friends, followers, and other users of social networking system 160. Once Go Live option 440 is selected, client system 130 used by the broadcaster begins capturing and transmitting the live video to social networking system 160 where it is broadcast to those users 101 who have chosen to view the live video. In some embodiments, Go Live option 440 may be selected at any time once lobby interface 410 is open. For example, the broadcaster may select Go Live option 410 early (i.e., before the scheduled start time) if they so desire. In some embodiments, if the broadcaster is late selecting Go Live option 440 (i.e., after the scheduled start time), a message may appear in lobby interface 410B to indicate that the broadcaster is late to start the live video. In some embodiments, the broadcaster must select Go Live option 440 (or any other appropriate selectable option) in order to begin broadcasting the live video. In other words, the live video in some embodiments will not begin broadcasting to other users 101 unless the broadcaster selects an option such as Go Live option 440. In some embodiments, if an option such as Go Live option 440 is not selected to begin the live video after a predetermined amount of time after the scheduled start time, the live video may be canceled and lobby interfaces 410 may close.

In some embodiments, lobby interface 410B that is displayed to viewers 101 includes an option 445 to subscribe to all future live videos of the broadcaster. For example, if a particular viewer 101 is viewing lobby interface 410B for a live video of Taylor Swift and has not previously subscribed to Taylor Swift's live videos, option 445 may be included in lobby interface 410B. Option 445 (or a selectable option within option 445) may be selected in order to receive notifications in the future (as described above) when Taylor Swift broadcasts live videos.

Figures 4C, 4D:
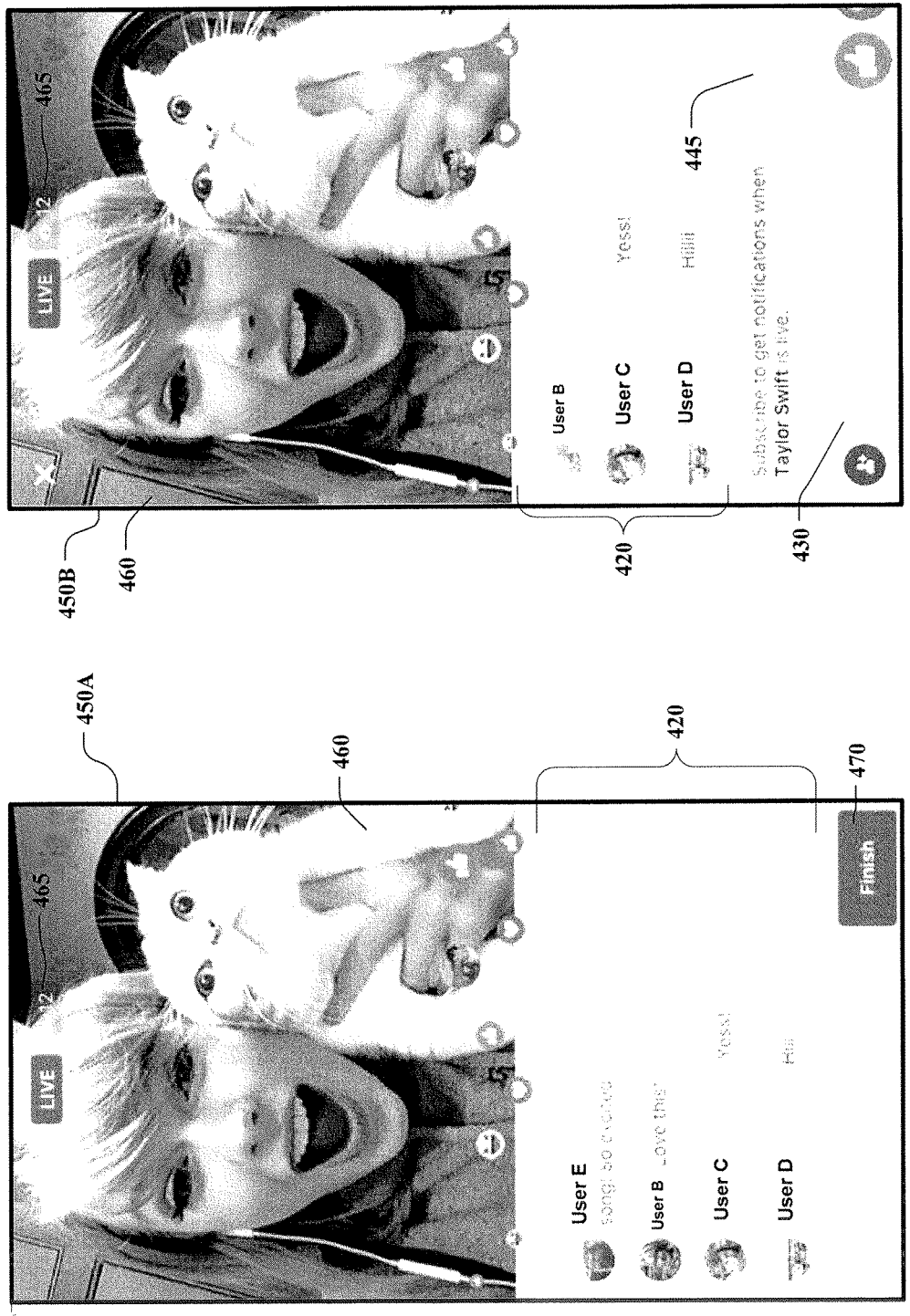

FIGS. 4C-4D illustrate live video interfaces 450 (i.e., 450A-B) that may be displayed to users 101 at or after the scheduled start time of a live video. In some embodiments, live video interface 450A is displayed to the broadcaster (e.g., Taylor Swift), and live video interface 450B is displayed to viewers 101 of the live video. In some embodiments, area 415 (above comment area 420 as illustrated in FIGS. 4A-4B) may be replaced with a live video 460 as illustrated in FIGS. 4C-4D at the scheduled start time. In certain embodiments, live video interfaces 450 may be completely filled with live video 460 (i.e., a full-screen live video) either automatically (e.g., when client system 130 is rotated to a certain orientation) or when a selectable element within live video interfaces 450 is selected. In embodiments with a full-screen live video 460, comment area 430 may be initially hid from view, but may be forced to reappear using a sliding touch motion or any other appropriate option within live video interface 450. In some embodiments, comments may be overlaid or may float across a full-screen live video 460. In some embodiments, live video interface 450A includes a Finish option 470. Finish option 470, once selected by the broadcaster, causes live video 460 to end and, in some embodiments, causes live video interfaces 460 to close.

In some embodiments, social graph 200 is utilized to determine which users have chosen to view a scheduled live video. For example, once a particular user 101 has chosen to view a live video (e.g., by selecting follow option 365), a "follow" edge 206 may be created in social graph 200 between a user node 202 of the particular user 101 and a concept node 204 of the live video to indicate that the particular user 101 wishes to view the scheduled live video. As another example, once a particular user 101 has chosen to like a particular celebrity user 101 (e.g., by selecting a "like" option on the celebrity user's profile page), a "like" edge 206 may be created in social graph 200 between a user node 202 of the particular user 101 and a user node 202 of the celebrity user 101. These, or any other appropriate nodes/edges in social graph 200, may be used, for example, to determine which users 101 should receive notifications of scheduled live videos.

In some embodiments, interfaces 310, lobby interfaces 410, and other interfaces described herein may be operated via audible commands. As an example, user 101 may issue voice commands to client system 130 in order to select selectable element 320 and options 340. As another example, user 101 may issue voice commands to client system 130 to select Go Live option 440 and Finish option 470.

Figure 5:
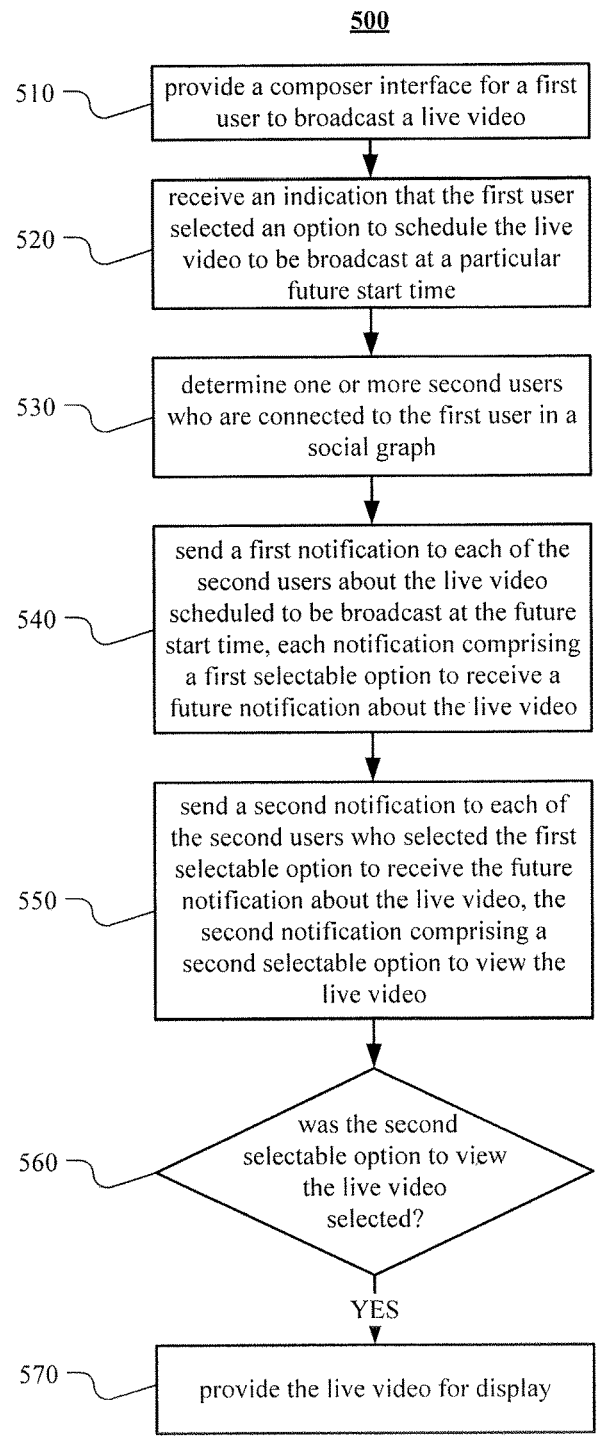
FIG. 5 illustrates an example method for scheduling live videos.

FIG. 5 illustrates an example method 500 for scheduling live videos. One or more steps of method 500 may be performed by one or more systems of social networking system 160. Method 500 may begin at step 510, where a composer interface is provided for a first user to broadcast a live video. In some embodiments, the composer interface provided in step 510 may be composer interface 310B that is provided to a user 101. In some embodiments, the composer interface includes one or more options to schedule the live video to be broadcast at a future start time. In some embodiments, the one or more options to schedule the live video to be broadcast at the future start time include an option to begin broadcasting the live video a selectable amount of time from a current date and time or an option to begin broadcasting the live video at a specific date and time. In some embodiments, the one or more options may be options 340. In some embodiments, the composer interface includes one or more selectable options to begin broadcasting the live video based on a trigger as determined from a social graph such as social graph 200.

At step 520, an indication that a first user has selected the one or more options to schedule the live video to be broadcast at a particular future start time is received. In some embodiments, the indication of step 520 is received by social networking system 160. At step 530, one or more second users who are connected to the first user in a social graph are determined. In some embodiments, the social graph is social graph 200 of FIG. 2. In some embodiments, the one or more second users who are connected to the first user are friends of the first user, followers of the first user, or are connected to the first user in any other appropriate manner in the social graph.

At step 540, a first notification about the live video scheduled to be broadcast at the future start time is sent to each of the second users of step 530. In some embodiments, each notification of step 540 includes a first selectable option to receive a future notification about the live video. In some embodiments, the first selectable option is follow option 365. In some embodiments, the future notification of step 540 is notification 380A or 380B, post 390A or 390B, or any other appropriate notification or post from social networking system 160.

At step 550, a second notification is sent to each of the second users who selected the first selectable option in step 540. In some embodiments, the second notification of step 550 includes a second selectable option to view the live video. In certain embodiments, the second notification is sent to each of the second users a predetermined amount of time before the scheduled start time of the live video (e.g., five minutes). In some embodiments, the second notification of step 550 is post 390 or notification 380. In some embodiments, the second selectable option is join option 395, notification 380, or image 335.

At step 560, it is determined whether the second selectable option of step 550 has been selected. If yes, method 500 proceeds to step 570 where the live video is provided for display to each of the second users who selected the second selectable option of step 550. In some embodiments, the live video may be provided for display in place of image 335 in post 390, in live video interfaces 450, in lobby interfaces 410, or in any other interface of client system 130. In some embodiments, in response to receiving the indication that the particular second user has selected the second selectable option to view the live video before the start time of the live video, an indication may be provided to the particular second user that the live video is currently not available. After step 570, method 500 may end.

Particular embodiments may repeat one or more steps of the method of FIG. 5, where appropriate. Although this disclosure describes and illustrates particular steps of the method of FIG. 5 as occurring in a particular order, this disclosure contemplates any suitable steps of the method of FIG. 5 occurring in any suitable order. Moreover, although this disclosure describes and illustrates an example method for scheduling live videos including the particular steps of the method of FIG. 5, this disclosure contemplates any suitable method for scheduling live videos including any suitable steps, which may include all, some, or none of the steps of the method of FIG. 5, where appropriate. Furthermore, although this disclosure describes and illustrates particular components, devices, or systems carrying out particular steps of the method of FIG. 5, this disclosure contemplates any suitable combination of any suitable components, devices, or systems carrying out any suitable steps of the method of FIG. 5.

Figure 6:
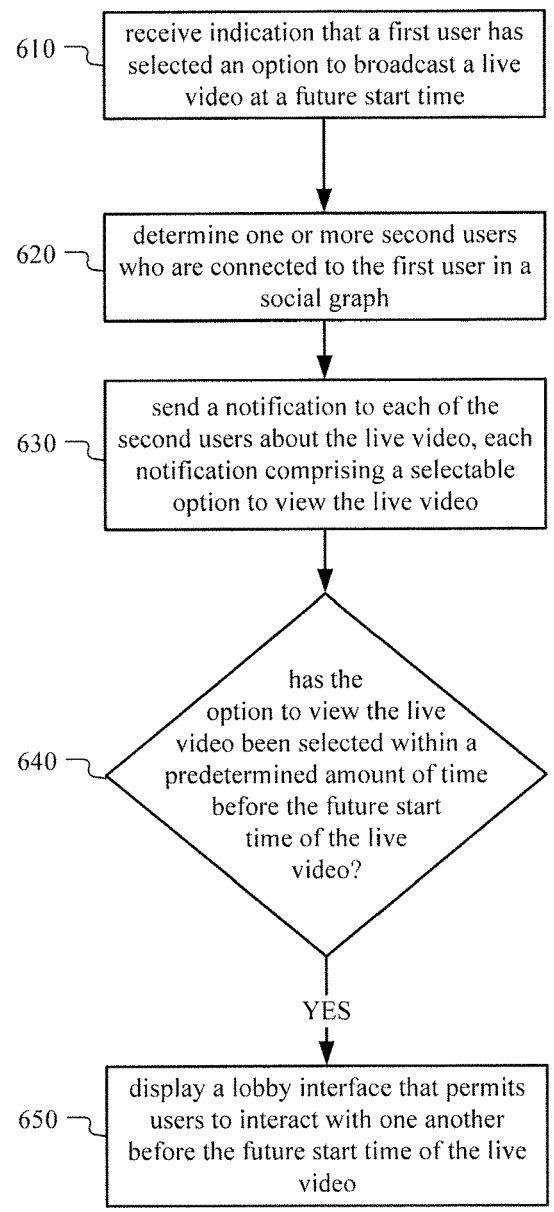
FIG. 6 illustrates an example method for displaying a lobby interface for viewing live videos.

FIG. 6 illustrates an example method 600 for displaying a lobby interface for viewing live videos. One or more steps of method 600 may be performed by one or more systems of social networking system 160. Method 600 may begin at step 610, where an indication that a first user has selected an option to broadcast a live video at a future start time is received. In some embodiments, the indication is received by social networking system 160. In some embodiments, the option is selectable element 330 or one or more options 340. In some embodiments, the first user is a particular user 101 such as a celebrity or a corporate/business user 101.

At step 620, one or more second users who are connected to the first user in a social graph are determined. In some embodiments, the social graph is social graph 200. In some embodiments, the one or more second users who are connected to the first user are friends of the first user, followers of the first user, or are connected to the first user in any other appropriate manner in the social graph.

At step 630, a notification about the live video is sent to each of the second users of step 620. In some embodiments, each notification sent in step 630 includes a selectable option to view the live video. In some embodiments, the notification of step 630 is post 390 or notification 380. In some embodiments, the selectable option is join option 395, notification 380, or image 335.

At step 640, it is determined if a particular second user has selected the selectable option of step 630 to view the live video within a predetermined amount of time before the future start time of the live video. If so, method 600 proceeds to step 650 where a lobby interface is displayed to the particular second user. In some embodiments, the lobby interface permits the second users to interact with one another before the future start time of the live video. For example, the lobby interface may include a chat area that permits the second users to post comments and view comments from other second users. In some embodiments, the lobby interface is lobby interface 410. In some embodiments, the lobby interface includes a display area that may include one or more of a profile image of the first user, a pre-recorded video provided by the first user, or an advertisement. After step 650, method 600 may end.

In some embodiments, method 600 may additionally include providing a broadcaster interface to the first user prior to the future start time of the live video. In some embodiments, the broadcaster interface may be lobby interface 410A. In some embodiments, the broadcaster interface includes one or more selectable options that permit the broadcaster to moderate comments that are posted to the chat area by the second users. In some embodiments, the broadcaster interface may include a selectable option such as Go Live option 440 to begin broadcasting the live video.

In some embodiments, method 600 may additionally include closing the lobby interface of step 650 for all second users if the first user fails to select, within a predetermined time after the start time of the live video, the selectable option to begin broadcasting the live video. For example, if the first user (e.g., the broadcaster) fails to select Go Live option 440 within five minutes after the scheduled start time of the live video, the lobby interface may close for all second users.

In some embodiments, method 600 may additionally include determining if the particular second user has selected the selectable option in the notification outside of the predetermined amount of time before the future start time of the live video. If so, method 600 may provide an indication to the particular second user that the lobby interface is currently not available.

Particular embodiments may repeat one or more steps of method 600 of FIG. 6, where appropriate. Although this disclosure describes and illustrates particular steps of the method of FIG. 6 as occurring in a particular order, this disclosure contemplates any suitable steps of the method of FIG. 6 occurring in any suitable order. Moreover, although this disclosure describes and illustrates an example method for scheduling live videos including the particular steps of the method of FIG. 6, this disclosure contemplates any suitable method for scheduling live videos including any suitable steps, which may include all, some, or none of the steps of the method of FIG. 6, where appropriate. Furthermore, although this disclosure describes and illustrates particular components, devices, or systems carrying out particular steps of the method of FIG. 6, this disclosure contemplates any suitable combination of any suitable components, devices, or systems carrying out any suitable steps of the method of FIG. 6.

Figure 7:
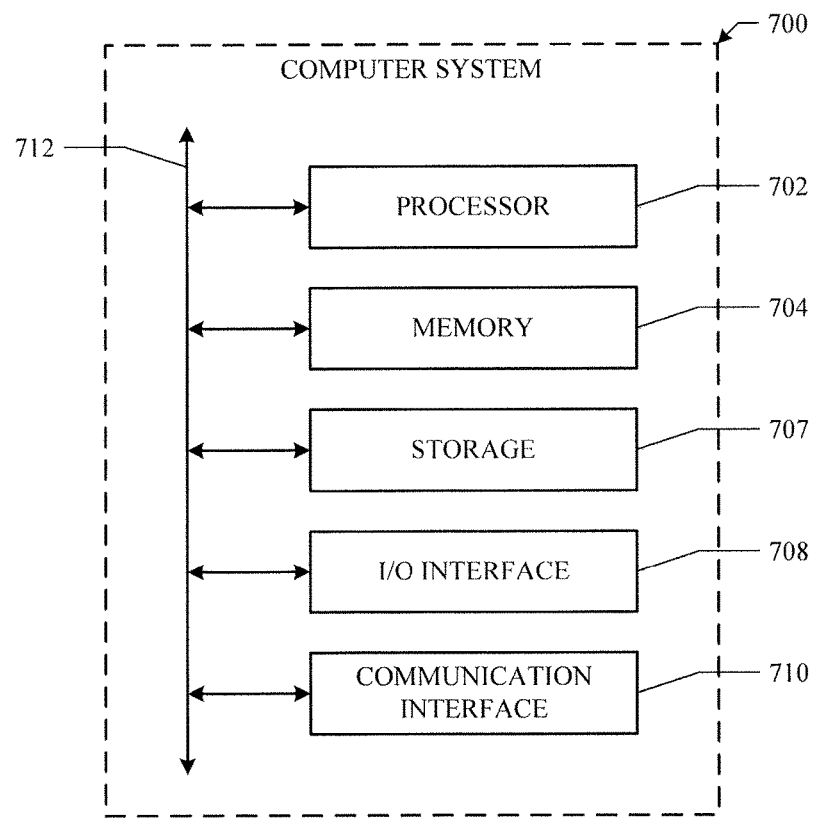
FIG. 7 illustrates an example computer system.

FIG. 7 illustrates an example computer system 700. In particular embodiments, one or more computer systems 700 perform one or more steps of one or more methods described or illustrated herein. In particular embodiments, one or more computer systems 700 provide functionality described or illustrated herein. In particular embodiments, software running on one or more computer systems 700 performs one or more steps of one or more methods described or illustrated herein or provides functionality described or illustrated herein. Particular embodiments include one or more portions of one or more computer systems 700. Herein, reference to a computer system may encompass a computing device, and vice versa, where appropriate. Moreover, reference to a computer system may encompass one or more computer systems, where appropriate.

This disclosure contemplates any suitable number of computer systems 700. This disclosure contemplates computer system 700 taking any suitable physical form. As example and not by way of limitation, computer system 700 may be an embedded computer system, a system-on-chip (SOC), a single-board computer system (SBC) (such as, for example, a computer-on-module (COM) or system-on-module (SOM)), a desktop computer system, a laptop or notebook computer system, an interactive kiosk, a mainframe, a mesh of computer systems, a mobile telephone, a personal digital assistant (PDA), a server, a tablet computer system, an augmented/virtual reality device, or a combination of two or more of these. Where appropriate, computer system 700 may include one or more computer systems 700; be unitary or distributed; span multiple locations; span multiple machines; span multiple data centers; or reside in a cloud, which may include one or more cloud components in one or more networks. Where appropriate, one or more computer systems 700 may perform without substantial spatial or temporal limitation one or more steps of one or more methods described or illustrated herein. As an example and not by way of limitation, one or more computer systems 700 may perform in real time or in batch mode one or more steps of one or more methods described or illustrated herein. One or more computer systems 700 may perform at different times or at different locations one or more steps of one or more methods described or illustrated herein, where appropriate.

In particular embodiments, computer system 700 includes a processor 702, memory 704, storage 706, an input/output (I/O) interface 708, a communication interface 710, and a bus 712. Although this disclosure describes and illustrates a particular computer system having a particular number of particular components in a particular arrangement, this disclosure contemplates any suitable computer system having any suitable number of any suitable components in any suitable arrangement.

In particular embodiments, processor 702 includes hardware for executing instructions, such as those making up a computer program. As an example and not by way of limitation, to execute instructions, processor 702 may retrieve (or fetch) the instructions from an internal register, an internal cache, memory 704, or storage 706; decode and execute them; and then write one or more results to an internal register, an internal cache, memory 704, or storage 706. In particular embodiments, processor 702 may include one or more internal caches for data, instructions, or addresses. This disclosure contemplates processor 702 including any suitable number of any suitable internal caches, where appropriate. As an example and not by way of limitation, processor 702 may include one or more instruction caches, one or more data caches, and one or more translation lookaside buffers (TLBs). Instructions in the instruction caches may be copies of instructions in memory 704 or storage 706, and the instruction caches may speed up retrieval of those instructions by processor 702. Data in the data caches may be copies of data in memory 704 or storage 706 for instructions executing at processor 702 to operate on; the results of previous instructions executed at processor 702 for access by subsequent instructions executing at processor 702 or for writing to memory 704 or storage 706; or other suitable data. The data caches may speed up read or write operations by processor 702. The TLBs may speed up virtual-address translation for processor 702. In particular embodiments, processor 702 may include one or more internal registers for data, instructions, or addresses. This disclosure contemplates processor 702 including any suitable number of any suitable internal registers, where appropriate. Where appropriate, processor 702 may include one or more arithmetic logic units (ALUs); be a multi-core processor; or include one or more processors 702. Although this disclosure describes and illustrates a particular processor, this disclosure contemplates any suitable processor.

In particular embodiments, memory 704 includes main memory for storing instructions for processor 702 to execute or data for processor 702 to operate on. As an example and not by way of limitation, computer system 700 may load instructions from storage 706 or another source (such as, for example, another computer system 700) to memory 704. Processor 702 may then load the instructions from memory 704 to an internal register or internal cache. To execute the instructions, processor 702 may retrieve the instructions from the internal register or internal cache and decode them. During or after execution of the instructions, processor 702 may write one or more results (which may be intermediate or final results) to the internal register or internal cache. Processor 702 may then write one or more of those results to memory 704. In particular embodiments, processor 702 executes only instructions in one or more internal registers or internal caches or in memory 704 (as opposed to storage 706 or elsewhere) and operates only on data in one or more internal registers or internal caches or in memory 704 (as opposed to storage 706 or elsewhere). One or more memory buses (which may each include an address bus and a data bus) may couple processor 702 to memory 704. Bus 712 may include one or more memory buses, as described below. In particular embodiments, one or more memory management units (MMUs) reside between processor 702 and memory 704 and facilitate accesses to memory 704 requested by processor 702. In particular embodiments, memory 704 includes random access memory (RAM). This RAM may be volatile memory, where appropriate Where appropriate, this RAM may be dynamic RAM (DRAM) or static RAM (SRAM). Moreover, where appropriate, this RAM may be single-ported or multi-ported RAM. This disclosure contemplates any suitable RAM. Memory 704 may include one or more memories 704, where appropriate. Although this disclosure describes and illustrates particular memory, this disclosure contemplates any suitable memory.

In particular embodiments, storage 706 includes mass storage for data or instructions. As an example and not by way of limitation, storage 706 may include a hard disk drive (HDD), a floppy disk drive, flash memory, an optical disc, a magneto-optical disc, magnetic tape, or a Universal Serial Bus (USB) drive or a combination of two or more of these. Storage 706 may include removable or non-removable (or fixed) media, where appropriate. Storage 706 may be internal or external to computer system 700, where appropriate. In particular embodiments, storage 706 is non-volatile, solid-state memory. In particular embodiments, storage 706 includes read-only memory (ROM). Where appropriate, this ROM may be mask-programmed ROM, programmable ROM (PROM), erasable PROM (EPROM), electrically erasable PROM (EEPROM), electrically alterable ROM (EAROM), or flash memory or a combination of two or more of these. This disclosure contemplates mass storage 706 taking any suitable physical form. Storage 706 may include one or more storage control units facilitating communication between processor 702 and storage 706, where appropriate. Where appropriate, storage 706 may include one or more storages 706. Although this disclosure describes and illustrates particular storage, this disclosure contemplates any suitable storage.

In particular embodiments, I/O interface 708 includes hardware, software, or both, providing one or more interfaces for communication between computer system 700 and one or more I/O devices. Computer system 700 may include one or more of these I/O devices, where appropriate. One or more of these I/O devices may enable communication between a person and computer system 700. As an example and not by way of limitation, an I/O device may include a keyboard, keypad, microphone, monitor, mouse, printer, scanner, speaker, still camera, stylus, tablet, touch screen, trackball, video camera, another suitable I/O device or a combination of two or more of these. An I/O device may include one or more sensors. This disclosure contemplates any suitable I/O devices and any suitable I/O interfaces 708 for them. Where appropriate, I/O interface 708 may include one or more device or software drivers enabling processor 702 to drive one or more of these I/O devices. I/O interface 708 may include one or more I/O interfaces 708, where appropriate. Although this disclosure describes and illustrates a particular I/O interface, this disclosure contemplates any suitable I/O interface.

In particular embodiments, communication interface 710 includes hardware, software, or both providing one or more interfaces for communication (such as, for example, packet-based communication) between computer system 700 and one or more other computer systems 700 or one or more networks. As an example and not by way of limitation, communication interface 710 may include a network interface controller (NIC) or network adapter for communicating with an Ethernet or other wire-based network or a wireless NIC (WNIC) or wireless adapter for communicating with a wireless network, such as a WI-FI network. This disclosure contemplates any suitable network and any suitable communication interface 710 for it. As an example and not by way of limitation, computer system 700 may communicate with an ad hoc network, a personal area network (PAN), a local area network (LAN), a wide area network (WAN), a metropolitan area network (MAN), or one or more portions of the Internet or a combination of two or more of these. One or more portions of one or more of these networks may be wired or wireless. As an example, computer system 700 may communicate with a wireless PAN (WPAN) (such as, for example, a BLUETOOTH WPAN), a WI-FI network, a WI-MAX network, a cellular telephone network (such as, for example, a Global System for Mobile Communications (GSM) network), or other suitable wireless network or a combination of two or more of these. Computer system 700 may include any suitable communication interface 710 for any of these networks, where appropriate. Communication interface 710 may include one or more communication interfaces 710, where appropriate. Although this disclosure describes and illustrates a particular communication interface, this disclosure contemplates any suitable communication interface.

In particular embodiments, bus 712 includes hardware, software, or both coupling components of computer system 700 to each other. As an example and not by way of limitation, bus 712 may include an Accelerated Graphics Port (AGP) or other graphics bus, an Enhanced Industry Standard Architecture (EISA) bus, a front-side bus (FSB), a HYPERTRANSPORT (HT) interconnect, an Industry Standard Architecture (ISA) bus, an INFINIBAND interconnect, a low-pin-count (LPC) bus, a memory bus, a Micro Channel Architecture (MCA) bus, a Peripheral Component Interconnect (PCI) bus, a PCI-Express (PCIe) bus, a serial advanced technology attachment (SATA) bus, a Video Electronics Standards Association local (VLB) bus, or another suitable bus or a combination of two or more of these. Bus 712 may include one or more buses 712, where appropriate. Although this disclosure describes and illustrates a particular bus, this disclosure contemplates any suitable bus or interconnect.

Herein, a computer-readable non-transitory storage medium or media may include one or more semiconductor-based or other integrated circuits (ICs) (such, as for example, field-programmable gate arrays (FPGAs) or application-specific ICs (ASICs)), hard disk drives (HDDs), hybrid hard drives (HHDs), optical discs, optical disc drives (ODDs), magneto-optical discs, magneto-optical drives, floppy diskettes, floppy disk drives (FDDs), magnetic tapes, solid-state drives (SSDs), RAM-drives, SECURE DIGITAL cards or drives, any other suitable computer-readable non-transitory storage media, or any suitable combination of two or more of these, where appropriate. A computer-readable non-transitory storage medium may be volatile, non-volatile, or a combination of volatile and non-volatile, where appropriate.

Herein, "or" is inclusive and not exclusive, unless expressly indicated otherwise or indicated otherwise by context. Therefore, herein, "A or B" means "A, B, or both," unless expressly indicated otherwise or indicated otherwise by context. Moreover, "and" is both joint and several, unless expressly indicated otherwise or indicated otherwise by context. Therefore, herein, "A and B" means "A and B, jointly or severally," unless expressly indicated otherwise or indicated otherwise by context.

The scope of this disclosure encompasses all changes, substitutions, variations, alterations, and modifications to the example embodiments described or illustrated herein that a person having ordinary skill in the art would comprehend. The scope of this disclosure is not limited to the example embodiments described or illustrated herein. Moreover, although this disclosure describes and illustrates respective embodiments herein as including particular components, elements, feature, functions, operations, or steps, any of these embodiments may include any combination or permutation of any of the components, elements, features, functions, operations, or steps described or illustrated anywhere herein that a person having ordinary skill in the art would comprehend. Furthermore, reference in the appended claims to an apparatus or system or a component of an apparatus or system being adapted to, arranged to, capable of, configured to, enabled to, operable to, or operative to perform a particular function encompasses that apparatus, system, component, whether or not it or that particular function is activated, turned on, or unlocked, as long as that apparatus, system, or component is so adapted, arranged, capable, configured, enabled, operable, or operative. Additionally, although this disclosure describes or illustrates particular embodiments as providing particular advantages, particular embodiments may provide none, some, or all of these advantages.

What is claimed is:

1. A method comprising:
    by one or more computing devices, receiving an indication from a client computing device associated with a first user that the first user has selected a particular option from a plurality of options in a composer interface provided on the client computing device, the plurality of options operable to schedule a five video for broadcast by the first user at a future start time, the plurality of options comprising:
        an option to begin broadcasting the live video at a plurality of independently selectable amounts of time from a current date and time; and
        an option to begin broadcasting the live video at a specific date and time;
    by the one or more computing devices, determining one or more second users who are connected to the first user in a social graph;
    by the one or more computing devices, sending a first notification to each of the second users about the live video scheduled for broadcast at the future start time, each notification comprising a first selectable option to receive a future notification about the live video;
    by the one or more computing devices, sending a second notification to each of the second users who selected the first selectable option to receive the future notification about the live video, the second notification comprising a second selectable option to view the live video; and by the one or more computing devices, in response to receiving an indication that a particular second user has selected the second selectable option to view the live video, providing the live video for display to the particular second user.

2. The method of claim 1, wherein the composer interface further comprises one or more selectable options to begin broadcasting the live video based on a trigger as determined from the social graph.

3. The method of claim 1, wherein the second, notification is sent to each of the second users a predetermined amount of time before the scheduled star time of the live video.

4. The method of claim 3, further comprising:
by the one or more computing devices, in response to receiving the indication that the particular second user has selected the second selectable option to view the live video before the start time of the live video, providing an indication to the particular second user that the live video is currently not available.

5. The method of claim 1, wherein the first notification comprises a profile image of the first user.

6. The method of claim 1, wherein the live video is displayed as a full-screen video.

7. One or more computer readable non-transitory storage media embodying software that is operable when executed to:
receive an indication from a client computing device associated with a first user that the first user has selected a particular option from a plurality of options in a composer interface provided on the client computing device, the plurality of options operable to schedule a live video for broadcast by the first user at a future start time, the plurality of options comprising:
an option to begin broadcasting the live video at a plurality of independently selectable amounts of time from a current date and time; and
an option to begin broadcasting the live video at a specific date and time;
determine one or more second users who are connected to the first user in a social graph;
send a first notification to each of the second users about the live video scheduled for broadcast at the future start time, each notification comprising a first selectable option to receive a future notification about the live video;
send a second notification to each of the second users who selected the first selectable option to receive the future notification about the live video, the second notification comprising a second selectable option to view the live video; and
in response to receiving an indication that a particular second user has selected the second selectable option to view the live video, provide the live video for display to the particular second user.

8. The media of claim 7, wherein the composer interface further comprises one or more selectable options to begin broadcasting the live video based on a trigger :as determined from the social graph.

9. The media of claim 7, wherein the second notification is sent to each of the second users a predetermined amount of time before the scheduled start time of the live video.

10. The media of claim 7, wherein the software is further operable when executed to:
in response to receiving the indication that the particular second user has selected the second selectable option to view the live video before the start time of the live video, provide an indication to the particular second user that the live video is currently not available.

11. The media of claim 7, wherein the first notification comprises a profile image of the first user.

12. The media of claim 7, wherein the live video is displayed as a full-screen video.

13. A system comprising:
one or more processors; and
a memory coupled to the processors, the memory comprising instructions executable by the one or more processors, the one or more processors being operable when executing the instructions to:
receive an indication from a client computing device associated with a first user that the first user has selected a particular option from a plurality of options in a composer interface provided on the client computing device, the plurality of options operable to schedule a live video for broadcast by the first user at a future start time, the plurality of options comprising:
an option to begin broadcasting the live video at a plurality of independently selectable amounts of time from a current date and time; and
an option to begin broadcasting the live video at a specific date and time;
determine one or more second users who are connected to the first user in a social graph:
send a first notification to each of the second users about the live video scheduled for broadcast at the future start time, each notification comprising a first selectable option to receive a future notification about the live video;
send a second notification to each of the second users who selected the first selectable option to receive the future notification about the live video, the second notification comprising a second selectable option to view the live video; and
in response to receiving an indication that a particular second user has selected the second selectable option to view the live video, provide the live video for display to the particular second user.

14. The system of claim 13, wherein the composer interface further comprises one or more selectable options to begin broadcasting the live video based on a trigger as determined from the social graph.

15. The system of claim 13, wherein the second notification is sent to each of the second users a predetermined amount of time before the scheduled start time of the live video.

16. The system of claim 13, wherein the one or more processors are further operable when executing the instructions to:
in response to receiving the indication that the particular second user has selected the second selectable option to view the live video before the start time of the live video, provide an indication to the particular second user that the live video is currently not available.

17. The system of claim 13, wherein the first notification comprises a profile image of the first user.

* * * * *